(12) United States Patent
Rogers

(10) Patent No.: US 11,330,920 B1
(45) Date of Patent: May 17, 2022

(54) SYSTEM OF INTERCONNECTING DISPLAY PLATES AND METHOD OF USE

(71) Applicant: Jonathan Lewis Rogers, Franklin, TN (US)

(72) Inventor: Jonathan Lewis Rogers, Franklin, TN (US)

( * ) Notice: Subject to any disclaimer, the term of this patent is extended or adjusted under 35 U.S.C. 154(b) by 0 days.

(21) Appl. No.: 17/369,485

(22) Filed: Jul. 7, 2021

(51) Int. Cl.
| | |
|---|---|
| *A47G 1/12* | (2006.01) |
| *A47F 3/00* | (2006.01) |
| *G09F 7/06* | (2006.01) |
| *G09F 7/02* | (2006.01) |
| *A47G 1/06* | (2006.01) |

(52) U.S. Cl.
CPC ............... *A47G 1/12* (2013.01); *A47F 3/004* (2013.01); *G09F 7/02* (2013.01); *G09F 7/06* (2013.01); *A47G 1/065* (2013.01)

(58) Field of Classification Search
CPC ........... A47G 1/12; A47G 1/065; A47F 3/004; G09F 7/20; G09F 7/22; G09F 3/12; G09F 7/02; G09F 7/06
See application file for complete search history.

(56) References Cited

U.S. PATENT DOCUMENTS

| | | | | |
|---|---|---|---|---|
| 162,250 A | * | 4/1875 | Moore | B60J 1/2011 160/215 |
| 485,229 A | * | 11/1892 | Reed | G09F 7/22 40/617 |
| 1,537,788 A | * | 5/1925 | Wentz | G09F 1/02 40/617 |
| 3,471,959 A | * | 10/1969 | Seger | G09F 15/0006 40/731 |
| 3,536,286 A | * | 10/1970 | Hyman | A47G 25/06 248/301 |
| 3,946,964 A | * | 3/1976 | Zinser | A62C 33/04 242/532.6 |
| 3,999,734 A | | 12/1976 | Gibson et al. | |
| 4,117,936 A | | 10/1978 | Dawson | |
| 4,584,950 A | | 4/1986 | Adams et al. | |
| 4,736,855 A | | 4/1988 | Arakawa | |
| 4,872,567 A | | 10/1989 | Bustos | |

(Continued)

FOREIGN PATENT DOCUMENTS

| | | |
|---|---|---|
| ES | 1171934 U | 12/2016 |
| KR | 200471483 Y1 | 2/2014 |

*Primary Examiner* — Ko H Chan
(74) *Attorney, Agent, or Firm* — Master Key IP, LLP; Jeromye V. Sartain

(57) ABSTRACT

A display system having a mounting plate configured for being secured on a wall, the mounting plate comprising a mounting plate body and a mounting plate connector formed on or in the mounting plate body, and a first display plate configured for being removably installed on the mounting plate, the first display plate comprising a first display plate body and a first display plate first connector formed on or in the first display plate body, the first display plate first connector configured for selectively engaging the mounting plate connector, the first display plate body having a first indicia formed thereon, whereby upon securing the mounting plate on the wall and removably installing the first display plate on the mounting plate as by engaging the first display plate first connector with the mounting plate connector the first indicia formed on the first display plate body is visible.

20 Claims, 11 Drawing Sheets

(56) References Cited

U.S. PATENT DOCUMENTS

| | | | | |
|---|---|---|---|---|
| 4,934,625 | A | * | 6/1990 | Richardson .......... B65H 75/366 |
| | | | | 242/588.2 |
| 5,394,996 | A | | 3/1995 | Carpenter |
| 5,411,144 | A | | 5/1995 | Deupree |
| 5,848,709 | A | | 12/1998 | Gelphman et al. |
| 5,853,091 | A | | 12/1998 | Luenser |
| 6,431,374 | B1 | | 8/2002 | Winikoff |
| 6,533,132 | B1 | * | 3/2003 | Weisenburger ......... A01K 97/08 |
| | | | | 211/118 |
| 6,860,045 | B1 | | 3/2005 | Sadler et al. |
| 7,188,814 | B2 | * | 3/2007 | Davis ................... B65H 75/366 |
| | | | | 248/302 |
| 7,234,245 | B2 | | 6/2007 | Tatum |
| 7,764,857 | B2 | * | 7/2010 | Sjodin .................. G02B 6/4471 |
| | | | | 385/135 |
| 9,633,582 | B2 | * | 4/2017 | Widener .................... G09F 7/18 |
| 2007/0167202 | A1 | | 7/2007 | Belzile |
| 2009/0039742 | A1 | | 2/2009 | Ripley, Jr. |
| 2015/0090676 | A1 | | 4/2015 | Florek |
| 2016/0046116 | A1 | * | 2/2016 | Widener ................. G09F 3/204 |
| | | | | 156/249 |
| 2021/0022527 | A1 | | 1/2021 | Keller |

\* cited by examiner

SYSTEM OF INTERCONNECTING DISPLAY PLATES AND METHOD OF USE

BACKGROUND

The subject of this patent application relates generally to award or recognition display apparatuses, and more particularly to devices, systems, or methods configured for conveniently and uniformly displaying on a wall or the like awards or recognition received for or commemorating various accomplishments and activities.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, awards or recognition for a wide variety of accomplishments or involvement in sports, the arts, clubs and other organizations, professional contexts, etc. are widespread and well known and run the gamut in terms of the forms such commemorative items take and the occasions in which they are used, from celebrating a sports championship to recognizing years of service with a company or non-profit. Most often, these momentos are in the form of trophies, plaques, and medals that can be displayed on a wall or shelf or in a case, for example. Despite there being generally just a few types of such awards, the variety of sizes and shapes they can take is quite extensive and non-uniform and so presents a challenge in conveniently and efficiently displaying such awards in a home or office or other location. Even with medals, which may be relatively small and a relatively common size and shape or configuration suspended from a ribbon or the like, because such medals are cumbersome and likely to become entangled with each other by having a tendency to rotate or become askew when hung, they still present a challenge to display. And while plaques may require less space than trophies and may be more easily and predictably hung than medals, their size and variety as by typically being acquired over many years from a number of unrelated sources still renders uniform display nearly impossible as a practical matter. Inevitably, then, due to the inconvenience of displaying such awards, they end up in storage, such as in a drawer or a box in the attic, if not discarded altogether.

In an attempt to address such shortcomings or challenges with displaying award and recognition devices such as trophies, plaques, and medals, a number of approaches have been proposed over the years. Though particularly with trophies, there is no getting around the need for a fairly substantial horizontal surface or group of surfaces such as a wall shelf, bookcase, cabinet, or the like on or in which to place the trophies for display, which trophies may of course also be a variety of heights (sizes and shapes), thereby presenting further challenges when it comes to cabinets or shelving units. And plaques are simply pieces or slabs of wood, metal, stone or ceramic, or even plastic that are directly printed, engraved, or the like or on the face of which is mounted a printed, engraved, or otherwise marked plate, with the plaque then mounted or hung on a wall or leaned against a vertical surface while supported on a lower edge by a horizontal surface, as on a shelf or an easel, for example, in any case there again being only so many ways such plaques are configured and displayed with no uniformity in doing so.

U.S. Patent Application Publication No. US2009/0039742 by Ripley, Jr. is entitled "Universal Display Apparatus and Methods of Use Thereof" and is directed to such "a universal display apparatus comprising a housing, wherein the housing further comprises a substantially transparent front and a back with a plurality of apertures for receiving supporting members. Supporting members may selectively be placed in any of the plurality of apertures within the back of the housing, such that a user can create a universal display case which is capable of holding any size, shape and/or dimension object which fits within the housing of the universal display apparatus." As shown in the drawings of the Ripley, Jr. application, the disclosed "universal display apparatus" is essentially configured as a case that can be wall-mounted or placed on a shelf or cabinet or the like, the case having a glass or clear front for displaying a variety of awards inside such as trophies and medals and related momentos as somewhat of a shadowbox-type case, with a pegboard-type back and pegs for customizing the display arrangement based on the items to be displayed.

U.S. Patent Application Publication No. US20070167202A1 by Belzile is entitled "Medal Display System" and discloses "a modular system for the display of medals or medallions with neck ribbons or chains. The invention comprises a primary and a secondary embodiment wherein the primary embodiment depicts a tower system, and the secondary embodiment depicting and [sic] wall mount system, which both utilize the ribbon attachment methods of the present invention. Each embodiment utilizes: one or more modular boxes, which can be stacked where medals can be displayed on the outside vertical faces of each exterior box face, a top portion to enclose the upper module, and a base to provide seating and elevation of the modules. The ribbons are attached individually on the upper interior side portion of the box by means of ribbon-clamping devices, which permit easy positioning and attachment. The unused length of ribbon is concealed within the box cavity. A lighted mechanical rotating base is also described."

And Spanish Patent No. ES1171934U to Gutierrez, based on machine translation, is entitled "Device for the Display of Medals" and is directed to such a device comprising "at least one medal-bearing plate (1), in which the medal (11a) is displayed on its front part; a support for arranging, adhering or engraving a legend (2), normally arranged in the lower part of the medal-bearing plate (1); [and] a fixing means that clamps or holds the ribbon (11b) of the medal (11b) on the back of the medal-bearing plate (1)." Essentially, with reference to the figures of the patent, there is disclosed a complicated system of interconnectable bases or plates with related supports, each base configured as a frame for selectively displaying a medal on the front side thereof while retaining the bulk of the ribbon on the back side thereof, with an interconnected display of such medal support bases forming a collective or unitary display or collage of sorts that may then be encompassed by a single larger perimeter frame and backing that surrounds each medal base while covering the interconnecting supports so as to present a uniform appearance from the front.

What all such awards such as trophies, plaques, and medals have in common is a printed, engraved, or otherwise marked surface containing an inscription of the particulars of the award or achievement, whether on the trophy plate typically affixed to the trophy base, on the plaque or its affixed plate, or on the front and/or back of the medal. And yet what all approaches to such award or recognition devices and related display systems also have in common is little if any standardization, instead taking a variety of forms that then necessitate a variety of devices to adequately store such award or recognition devices for display, adding cost, complexity, and inefficiency and still being suboptimal in terms of the physical space typically required for such award or recognition devices and related displays relative to the actual inscription that gives meaning to the award or recognition.

Therefore, what is still needed and has heretofore been unavailable is a relatively simple, inexpensive, convenient, and effective system for displaying awards or recognition that is universal in its approach and use across a variety of contexts. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a display system for displaying awards or recognition. In at least one embodiment, the display system comprises a mounting plate configured for being secured on a wall, the mounting plate comprising a mounting plate body and a mounting plate connector formed on or in the mounting plate body, and a first display plate configured for being removably installed on the mounting plate, the first display plate comprising a first display plate body and a first display plate first connector formed on or in the first display plate body and a first display plate second connector formed on or in the first display plate body offset from the first display plate first connector, the first display plate first connector configured for selectively engaging the mounting plate connector, the first display plate body having a first indicia formed thereon, whereby upon securing the mounting plate on the wall and removably installing the first display plate on the mounting plate as by engaging the first display plate first connector with the mounting plate connector the first indicia formed on the first display plate body is visible.

In a further exemplary embodiment, the display system comprises a second display plate configured for being removably installed on the first display plate, the second display plate comprising a second display plate body and a second display plate first connector formed on or in the second display plate body and a second display plate second connector formed on or in the second display plate body offset from the second display plate first connector, the second display plate first connector configured for selectively engaging the first display plate second connector, the second display plate body having a second indicia formed thereon, whereby upon further removably installing the second display plate on the first display plate as by engaging the second display plate first connector with the first display plate second connector the first indicia formed on the first display plate body and the second indicia formed on the second display plate body are visible.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
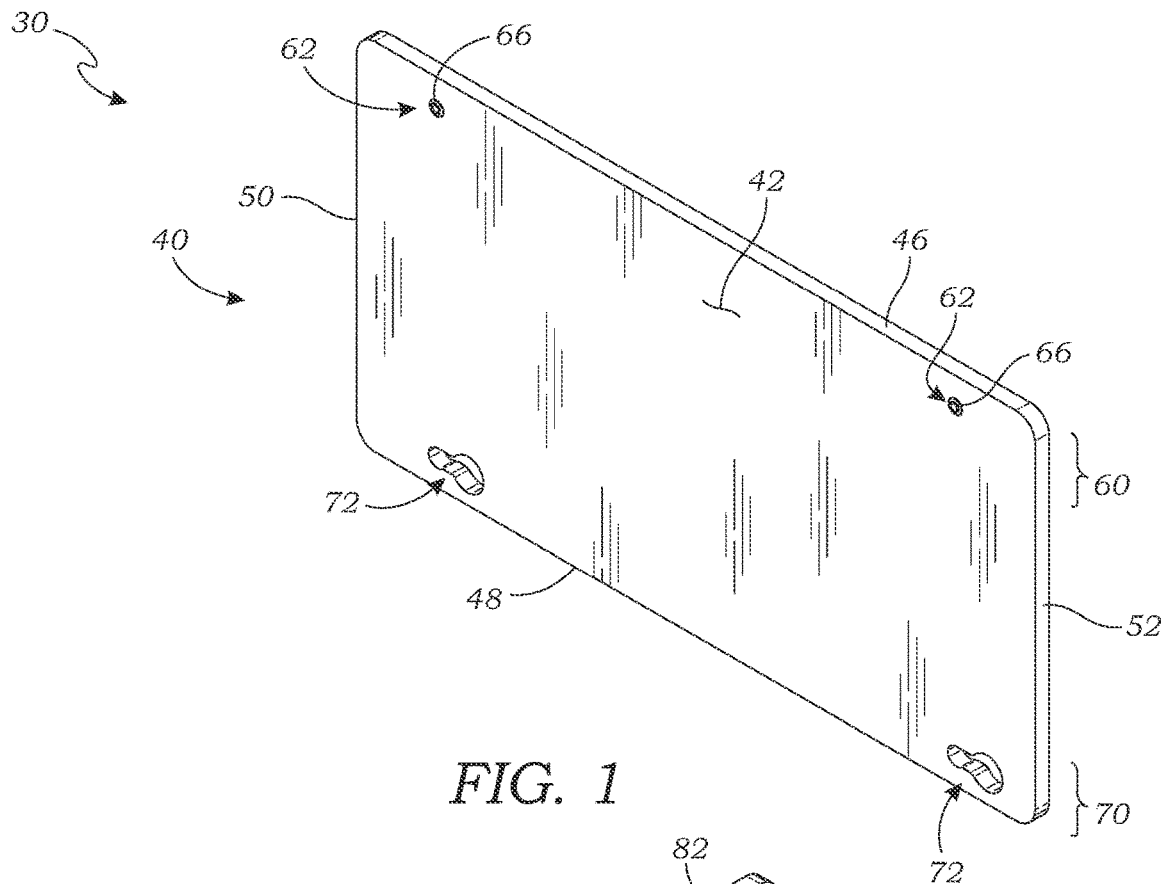
FIG. 1 is a front perspective view of an exemplary display plate of an exemplary display system, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Generally, a system of interconnecting display plates and related method of use according to aspects of the present invention, collectively denoted display system 20 throughout the figures, comprises a mounting plate 100 and one or more display plates 30 suspended from the mounting plate 100 directly or indirectly. In the figures and per the below description, there are shown and described an exemplary display plate 30 and an exemplary mounting plate 100 as formed and in use, though it will be appreciated by those skilled in the art that a variety of other configurations are possible according to aspects of the present invention without departing from its spirit and scope, with reference to the following discussion. As a practical matter, an improved award or recognition system is disclosed as a replacement for the various non-uniform trophies, plaques, medals, and the like that are often employed currently to award or recognize achievement in a variety of contexts. In one way of characterizing aspects of the present invention, there is provided a means for uniformly producing and displaying such awards, recognition, and the like that has advantages over typical awards in terms of cost and convenience, particularly as relating to the space and means required for display of such awards, such as physical shelf or wall space. In another way of characterizing aspects of the present invention, a system and method of use is provided wherein the indicia portion of currently employed trophies, plaques, medals, and the like is effectively standardized in terms of size in the form of a display plate and so configured apart from such trophy, plaque, medal and other products for being interconnected for selective display serially in somewhat of a chain-like fashion, again greatly reducing the footprint or surface area required to effectively display the same awards or recognition as well as lending itself to the addition of further awards with ease, all such display plates being interconnected from a common base or mounting plate. Those skilled in the art will appreciate that such can be accomplished through the standardized interconnection of such display plates 30 as suspended from a "starter strip" or mounting plate 100 through a variety of temporary mechanical engagement means now known or later developed beyond those shown and described herein without departing from the spirit and scope of the invention, except where specific structure is expressly disclosed and claimed as being preferred or optimal or otherwise particularly configured as part of a display system 20 according to aspects of the present invention.

Figure 2:
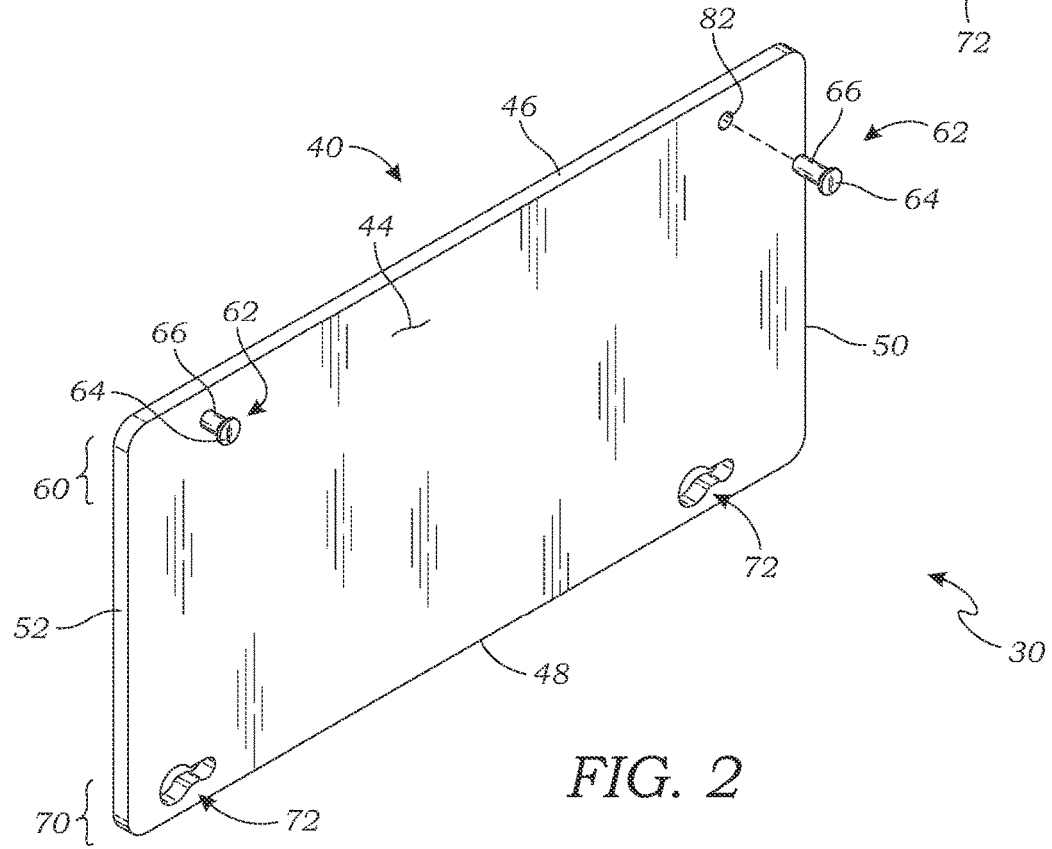
FIG. 2 is a rear and partially exploded perspective view thereof, in accordance with at least one embodiment.

Turning now to FIGS. 1 and 2, there are shown front and rear perspective views of an exemplary embodiment of a display plate 30 according to aspects of the present invention. The display plate 30 comprises, in the exemplary embodiment, a display plate body 40 in the form of a substantially flat, rectangular piece of material having a front surface 42 and an opposite rear surface 44 and display plate first and second connectors 60, 70 incorporated in or on the display plate body 40. In the exemplary embodiment, the display plate first connector 60 comprises a pair of spaced apart pins 62 formed on the display plate body 40 near its top edge 46 so as to extend substantially perpendicularly from the rear surface 44, and the display plate second connector 70 comprises a pair of spaced apart keyholes 72 corresponding to the pins 62 in configuration and location and formed within the display plate body 40 near its bottom edge 48 so as to communicate between the front and rear surfaces 42, 44 or pass through the display plate body 40. In the illustrated embodiment as best seen in FIG. 2, each pin 62 of the display plate first connector 60 is formed separately as having a pin head 64 and pin shaft 66 configured for insertion in a respective pinhole 82 formed in the display plate body 40 near its top edge 46 so as to communicate between the front and rear surfaces 42, 44 or pass through the display plate body 40, though it will be appreciated that such pinhole 82 need not be a through-hole and that such pins 62 may be formed integrally with the display plate body 40 in forming a display plate 30 according to aspects of the present invention.

Figure 3:
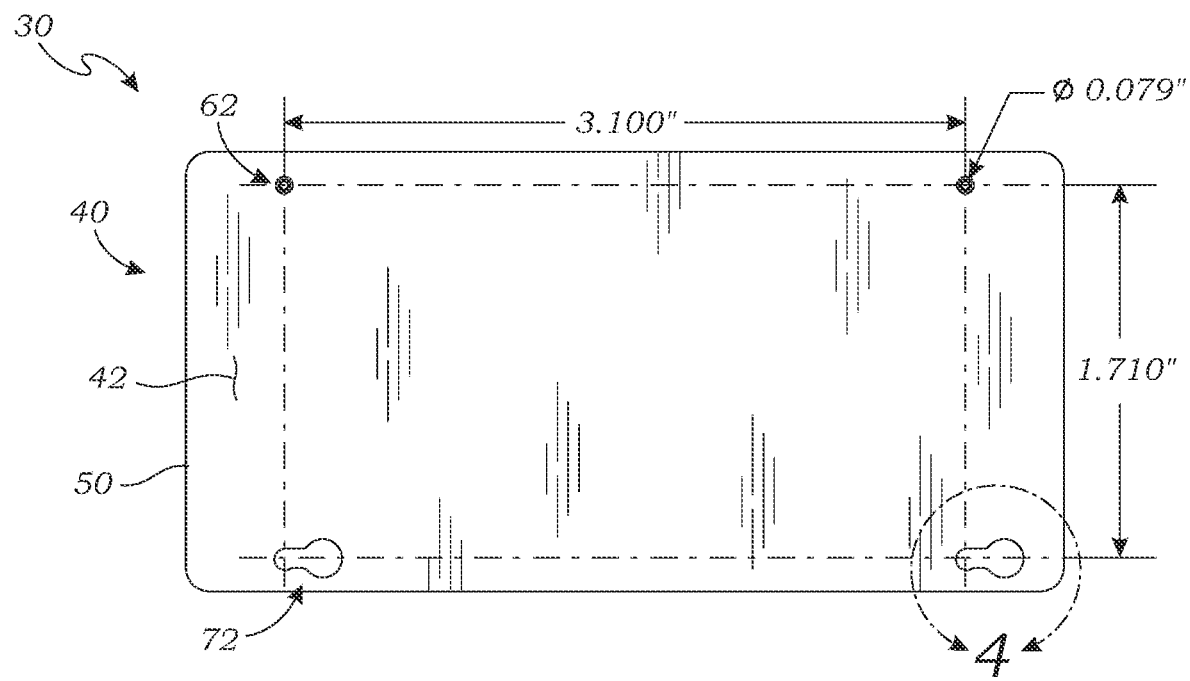
FIG. 3 is a front view thereof, in accordance with at least one embodiment.
Figure 4:
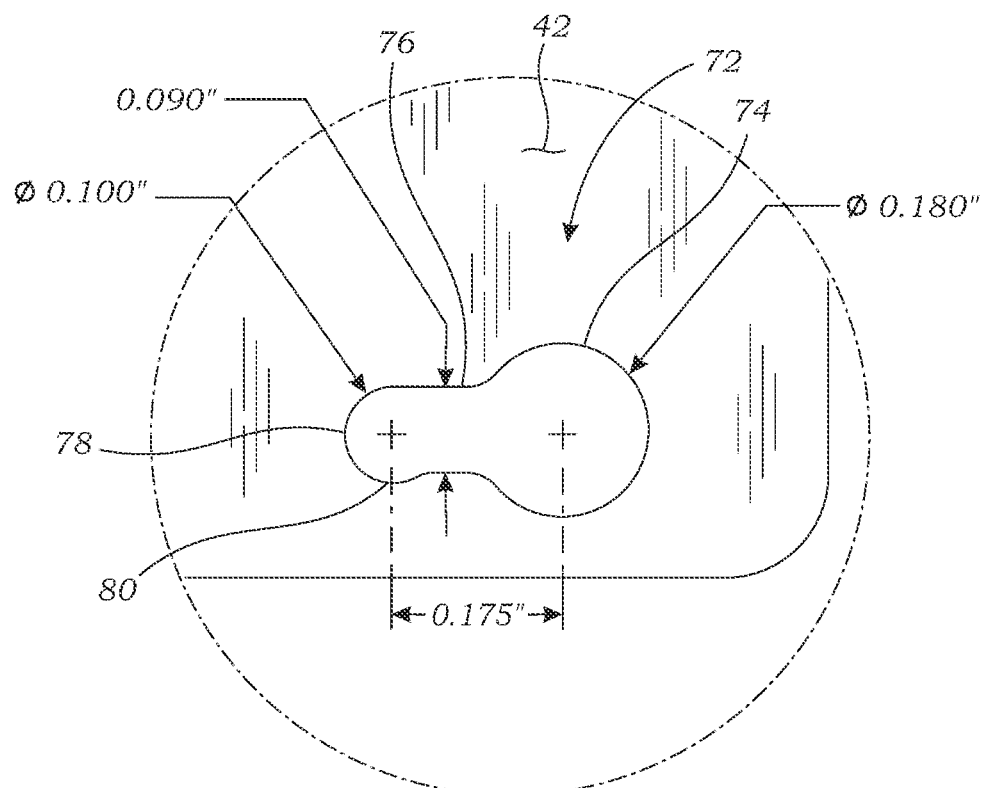
FIG. 4 is an enlarged partial front view thereof taken from circle "FIG. 4" in FIG. 3, in accordance with at least one embodiment.
Figure 5:
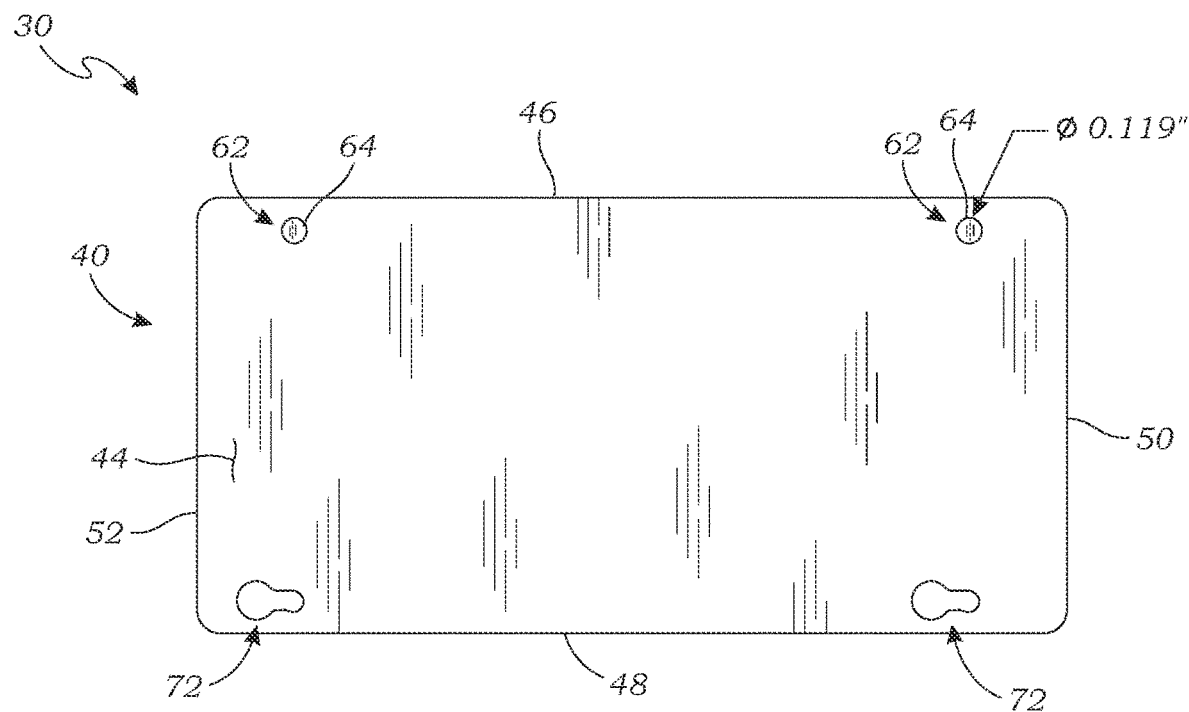
FIG. 5 is a back view thereof, in accordance with at least one embodiment.
Figure 6:
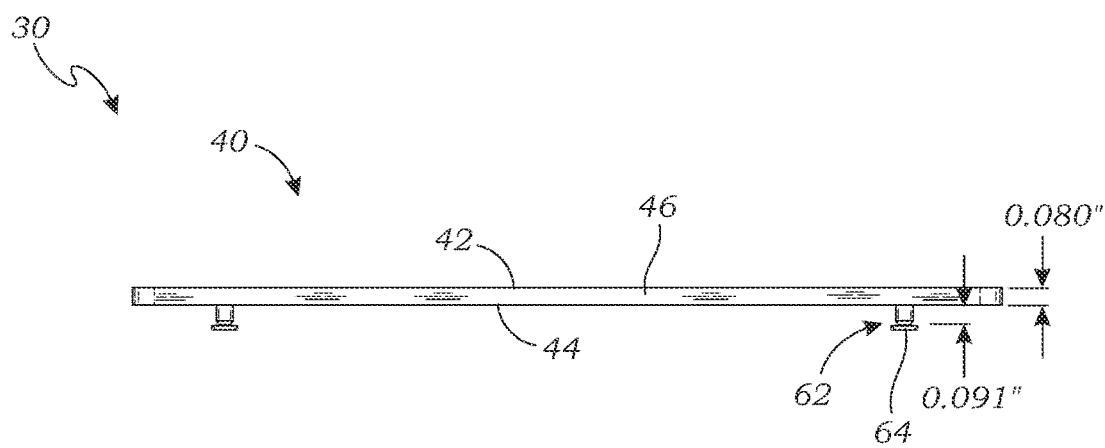
FIG. 6 is an top view thereof, in accordance with at least one embodiment.

With continued reference to FIGS. 1 and 2 and now also referring to the front, rear, and top views of FIGS. 3-6, the exemplary display plate 30 is again shown as comprising a flat, rectangular display plate body 40 having a pair of spaced-apart pins 62 at the rear side 44 near its top edge 46 defining the display plate first connector 60 and a pair of spaced-apart keyholes 72 near its bottom edge 48 defining the display plate second connector 70. The dimensioning (shape, size, and location) of such features of the display plate 30 is critical to its performance (function and aesthetics). In the exemplary embodiment, the display plate body 40 has a nominal overall size of two inches tall by four inches wide (2 in.×4 in.). As shown in FIG. 3, the lateral or horizontal spacing between both the pins 62 (and thus the pinholes 82) and the keyholes 72 is 3.100 in. Critically, the horizontal spacing of whatever distance must be substantially the same between offset pins 62 as between offset keyholes 72, and the respective pins 62 (and thus the pinholes 82) and the keyholes 72 must be substantially vertically aligned on the display plate body 40, specifically the pins 62 with the respective arcuate end or terminus 78 of the keyhole slot 76 as shown, which then serves to align the plates 30 relative to each other when linked through pin 62 and keyhole 72 engagement, more about which is said below in connection with FIGS. 12-17 illustrating the display system 20 in use. Continuing with the exemplary display plate 30, the pattern of pins 62 (and thus the pinholes 82) and the keyholes 72 (and particularly the keyhole terminuses 78) is thus substantially symmetrical and centered on the display plate body 40 left to right—in the exemplary embodiment wherein the plate body 40 is nominally 4.000" wide and the pinholes 82 and pins 62 as well as the respective keyhole terminuses 78 are spaced 3.100" apart, it follows that the pinholes 82 and pins 62 as well as the keyhole terminuses 78 are nominally 0.450" from the respective side edge 50, 52 of the display plate body 40. It will be appreciated that the overall keyholes 72 themselves are not centered left to right on the display plate body 40 so that their terminuses 78 can be. With reference to FIG. 4, an enlarged view of one of the keyholes 72, it can be seen that the relatively larger keyhole clearance 74 has a nominal diameter of 0.180", the relatively smaller opposite keyhole terminus 78 has a nominal diameter of 0.100", and the interconnecting keyhole slot 76 has a nominal width of 0.090". Notably, the center of the keyhole terminus 78 is shifted down by a nominal 0.010" relative to the center of the keyhole clearance 74 and the center of the keyhole slot 76, such that a keyhole detent 80 having a maximum depth nominally of 0.010" is formed between the keyhole slot 76 and keyhole terminus 78, which it will be appreciated in use when the pin 62 is passed into the keyhole 72 and particularly when the pin 62 is shifted along the keyhole 72 such that the pin shaft 66 comes to rest in the keyhole terminus 78, it will naturally settle into the keyhole detent 80 thereby discouraging the pin 62 from shifting back toward the keyhole clearance 74, again, more about which is said below regarding the display system 20 and particularly its interconnecting display plates 30 in use. With continued reference to FIGS. 3 and 4 and now FIGS. 5 and 6 as well, further related to the engagement of the pins 62 with the respective keyholes 72, it can be seen that while the pin shaft 66 has a nominal diameter of 0.079" the pin head 64 has a nominal diameter of 0.119". Moreover, the display plate body 40 has a nominal thickness of 0.080" while the distance from the bottom of the pin head 64 to the rear surface 44 of the display plate body 40 is nominally 0.091" such that the pin head 64 would ride along the display plate rear surface 44 in engaging the respective keyhole 72. On this basis, those skilled in the art will appreciate that in connecting two such display plates 30 together, for example, as by engaging each rearwardly-projecting pin 62 of a second plate with the respective keyhole 72 of a first plate, the nominal 0.119" diameter pin head 64 may easily pass through the keyhole clearance 74 that is nominally 0.180" and then, once the pin 62 is fully inserted as by bringing the opposed surfaces of the plates 30 substantially adjacent or in contact such that the pin head 64 is clear of the keyhole 72 at the rear surface 44 of the display plate body 40, the pin 62 may be shifted within the keyhole 72 as by the pin shaft 66 following the keyhole slot 76 until it stops at the keyhole terminus 78 and settles into the keyhole detent 80, with at all times while the pin 62 is within the keyhole slot 76 and keyhole terminus 78 the pin 62 being retained therein by the pin head 64, which at a nominal size again of 0.119" is larger than the keyhole 72 opening at the slot 76 or terminus 78 that are nominally 0.090-0.100". Alternatively, the display plate body 40 can be thicker than the nominal 0.080" indicated, with a relief formed in the rear surface 44 surrounding the respective keyholes 72 of sufficient depth to provide clearance for the engaging pins 62 and particularly the pin heads 64 to be retained within such counterbore while still not being able to pass through the keyhole slot 76 or terminus 78 when the pins 62 engage the keyholes 72. And back to the dimensions of the pin 62, where it is separately formed and to be press-fit into corresponding pinholes 82 formed in the display plate body 40, those skilled in the art will appreciate that the pin shaft 66 being roughly 0.001" to 0.002" larger in diameter than the pinhole 82 will generally provide a sufficient interference fit for retention of the pins 62 in the pinholes 82 of the display plate body 40. While precise exemplary dimensions are shown and described herein for the display plate 30 and its various noted features, it will be appreciated by those skilled in the art that such are merely illustrative of aspects of the present invention and non-limiting, except to emphasize once more that the consistent or uniform spacing and alignment of the display plate first and second connectors 60, 70 here configured as pins 62 and keyholes 72, respectively, is necessary to the proper function of the display system 20. Even so, as to any such dimensions that are to be maintained for uniformity and fit, it will be further appreciated that any such dimensions will provide the desired operability within a particular range or tolerance nominally of +1-0.015", which would be the range or tolerance for any dimensions or distances that are described as being substantially equal or substantially equidistant, though of course the outer perimeter or overall size of the display plate body 40, again nominally 2"×4", may vary by greater amounts within a single display system 20, and the pin head 64 sizing relative to the keyhole clearance 74 may vary by greater than 0.015" while still allowing for functional engagement between the pins 62 and keyholes 72 (selective retention of the pins 62 within the keyholes 72). More generally, those skilled in the art will once again appreciate that a variety of not just sizes but configurations and related means of engagement between the display plate first and second connectors 60, 70 may be employed without departing from the spirit and scope of the invention, such that the particular configurations and sizes of the pins 62 and keyholes 72 are to be understood as merely illustrative and non-limiting. And back to the exemplary pins 62 and keyholes 72 as the display plate first and second connectors 60, 70, it will be appreciated that while the pins 62 are shown as the upper or first connector 60 and the keyholes 72 as the lower or second connector 70, it is possible in other contexts or configurations to have that reversed. And no matter the position of the keyholes 72, they can be flipped so that the enlarged keyhole clearance 74 is toward the left rather than toward the right as the display plate 30 is viewed from the front (FIGS. 1 and 3), which would mean that engagement of the pins 62 with the keyholes 72 would be from left to right rather than right to left as in the illustrated embodiments. The number as well as the location of all such connectors 60, 70 or pins 62 and keyholes 72 may also vary, so long as the interconnection of components is still rendered reliable and relatively easy, the reliability or repeatability of such interconnection particularly including squaring up and aligning the various components as they are engaged, once again, more about which is said below in connection with FIGS. 12-17 regarding the exemplary display system 20 in use.

Figure 7:
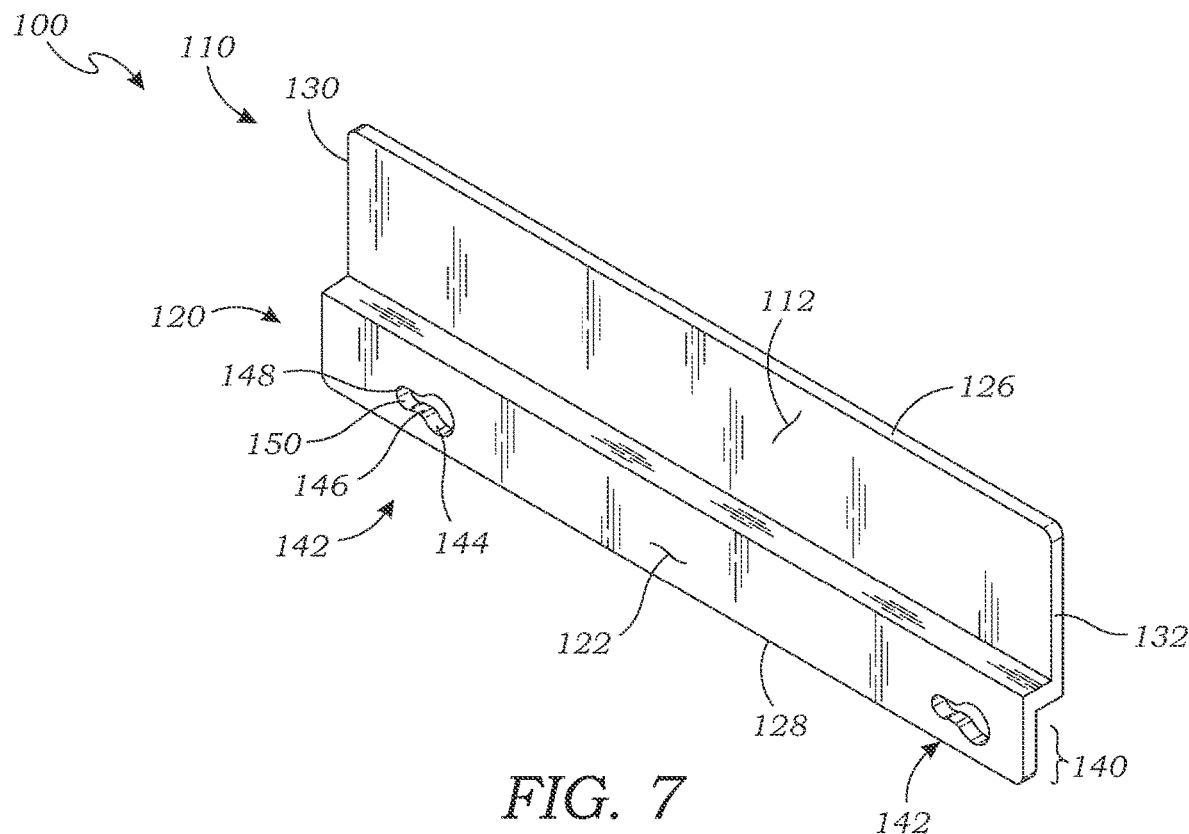
FIG. 7 is a front perspective view of an exemplary mounting plate of an exemplary display system, in accordance with at least one embodiment.
Figure 8:
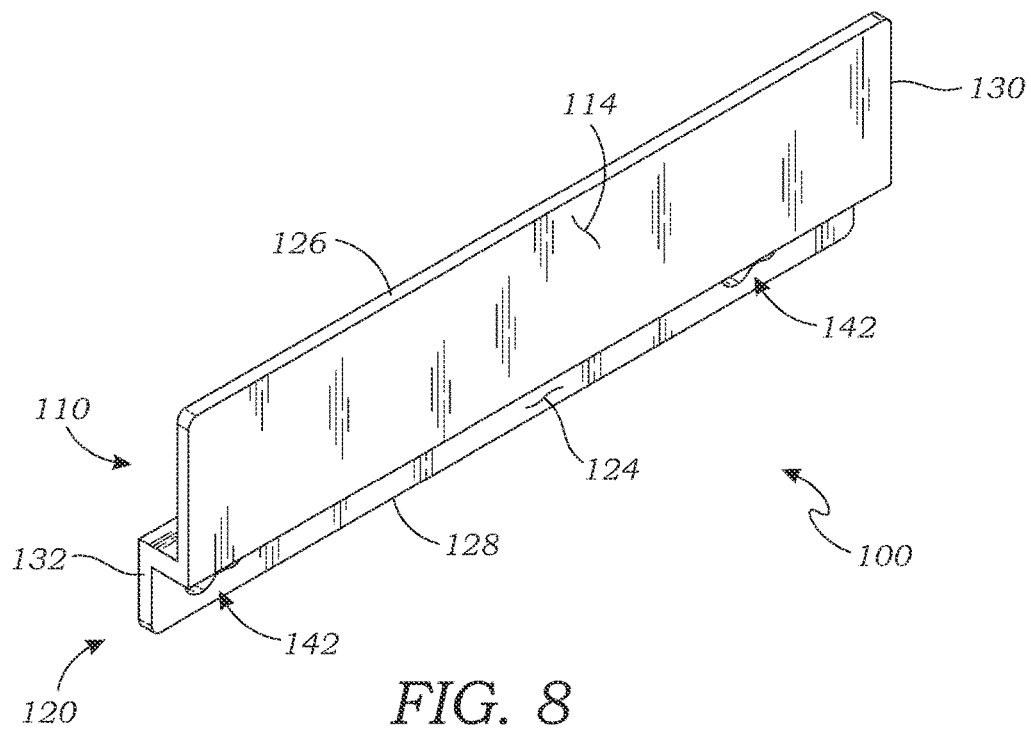
FIG. 8 is a rear perspective view thereof, in accordance with at least one embodiment.
Figure 9:
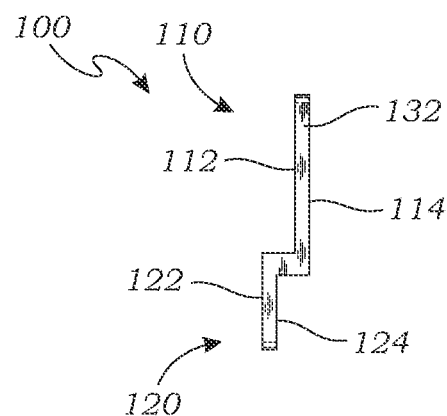
FIG. 9 is an end view thereof, in accordance with at least one embodiment.

Turning next to FIGS. 7-9, there are shown front and rear perspective views and an end view of an exemplary mounting plate 100 as employed in a display system 20 according to aspects of the present invention in conjunction with one or more display plates 30 as herein described. In the exemplary embodiment, the mounting plate 100 comprises a mounting plate body 110 having a front surface 112 and opposite rear surface 114, a stepped mounting plate flange 120 extending from the mounting plate body 110 so as to have staggered front and rear surfaces 122, 124, and a mounting plate connector 140 incorporated on or in the mounting plate 100. The overall mounting plate 100, or the mounting plate body 110 and the mounting plate flange 120 together, defines a perimeter or profile having a top edge 126, an opposite bottom edge 128, and opposite side edges 130, 132. As illustrated, formed in the mounting plate flange 120 and defining the exemplary mounting plate connector 140 are spaced-apart mounting plate keyholes 142 analogous to the display plate keyholes 72 shown and described in connection with FIGS. 1-6 here communicating between the front and rear surfaces 122, 124 of the mounting plate flange 120; indeed, though not shown with dimensional leaders in the figures, the center-to-center distance between the mounting plate keyholes 142 is again nominally 3.100" corresponding to the spacing of the exemplary display plate pins 62 and keyholes 72 shown and described herein, and the configuration of each mounting plate keyhole 142, again for consistency, also entails a relatively larger keyhole clearance 144, an interconnecting keyhole slot 146, an opposite relatively smaller keyhole terminus 148, and a keyhole detent 150 formed in the bottom of the keyhole terminus 148, all of which being geometrically or dimensionally comparable to the display plate keyholes 72. With the mounting plate flange 120 staggered or set slightly forward relative to the mounting plate body 110, it will be appreciated that space is provided behind the mounting plate flange 120 as effectively clearance for the pins 62, and particularly the pin heads 64, of a display plate 30 (FIGS. 1-6) that is interconnected with or hung from the mounting plate 100 in use as described further below in connection with FIGS. 12-17. Those skilled in the art will appreciate that such space is needed or preferable when as in the exemplary embodiment the thickness of the mounting plate 100, and its body 110 and flange 120 specifically, is about that of the display plates themselves, here nominally 0.080", but that it is equally possible that the mounting plate 100 or particularly the flange 120 thereof be formed thicker and a relief provided on the rear surface 124 thereof surrounding the keyhole 142 to provide clearance for the pin head 64 without the need for a stepped or staggered mounting plate flange 120. Dimensionally, particularly the overall width of the mounting plate 100, or again of the mounting plate body 110 and/or mounting plate flange 120, may again be four inches (4 in.) corresponding to the nominal width of each exemplary display plate 30 as set forth herein, on which basis those skilled in the art will appreciate that in use the mounting plate 100 and any display plates 30 suspended therefrom will have a common width and present a uniform appearance—at least any mounting plate flange 120 would typically have a width corresponding to that of the display plates 30 even if the mounting plate body 110 had some shape or size other than rectangular or a width in common with that of the display plates 30. Once again, it will be appreciated by those skilled in the art that a variety of such sizes, shapes, and configurations of a mounting plate 100 according to aspects of the present invention are possible other than those shown and described, which are again to be understood as illustrative and non-limiting. By way of further illustration and not limitation, in the case of an alternative exemplary embodiment wherein the display plate first and second connectors 60, 70 are reversed such that the keyholes 72 are at the top of the display plate body 40 and the pins 62 at the bottom, it will be appreciated that the mounting plate 100 may then be formed having a mounting plate connector 140 configured as corresponding pins (not shown) rather than the exemplary keyholes 142 for receipt thereon of the respective display plate keyholes 72. It will be further appreciated in such an alternative arrangement that depending on the configuration and offset of any mounting plate flange 120, such mounting plate pins may then extend forwardly or rearwardly. Somewhat relatedly, it is noted that in any such embodiment, or even with the exemplary arrangement of the display plate 30 of FIGS. 1-6 and the mounting plate 100 of FIGS. 7-9, it is possible to interconnect the respective display plates 30 in any chain front side out or front side in or both as in an alternating arrangement, which would cause the series of plates 30 to hang slightly differently and have differing degrees or portions of the outwardly-facing surface exposed (whether front or rear surface 42, 44), including some or alternating ones of the plates 30 having the keyholes 72 visible, as compared to the exemplary arrangement as illustrated below in use in FIGS. 12-17 wherein only the last or lowest display plate 30 in any given chain as defining the display system 20 has its keyholes 72 visible. Of course, those skilled in the art will appreciate in this context that if other means of removably or temporarily engaging the display plate(s) 30 with the mounting plate 100 are employed, the order or orientation of the plates 30 would perhaps not have so much of an effect on the appearance of the finished display system 20 as being described here.

In forming the exemplary display plate 30, including the first and second connectors 60, 70 and in the exemplary embodiment any related pins 62 or keyholes 72 or pinholes 82 or other features, and the exemplary mounting plate 100, including the mounting plate connector 140 in the exemplary embodiment in the form of spaced-apart keyholes 142, it will be appreciated that any appropriate materials and methods of construction now known or later developed may be employed, including but not limited to metals such as aluminum, steel, titanium, brass, alloys, and the like, a variety of plastics including but not limited to polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, and woods, resins, glass, or other such materials, any such components being fabricated or formed as through injection molding, casting, sintering, extrusion, machining, including CNC milling and drilling, stamping, cutting, including laser-cutting and saw-cutting, 3-D printing, forming, or any other such technique now known or later developed. Relatedly, such components may be formed integrally or may be formed separately and then assembled in any appropriate secondary operation employing any assembly technique now known or later developed, including but not limited to fastening, bonding, welding, overmolding or coining, press-fitting, snapping, or any other such technique now known or later developed. And finally, any such display plate 30 or mounting plate 100 or components thereof may be finished in any appropriate secondary operation(s) to achieve the desired appearance or surface treatment, such as tumbling, bead or grit blasting, grinding, deburring, sanding, buffing, anodizing, dip-molding or coating, powder-coating, chromate conversion coating, sealing, passivating, plating, painting, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting. It will be further appreciated that the mounting plate 100 and the individual display plates 30 may be formed of the same or different materials and/or formed by the same or different process(es) even if used together in a single display system 20.

Figure 10:
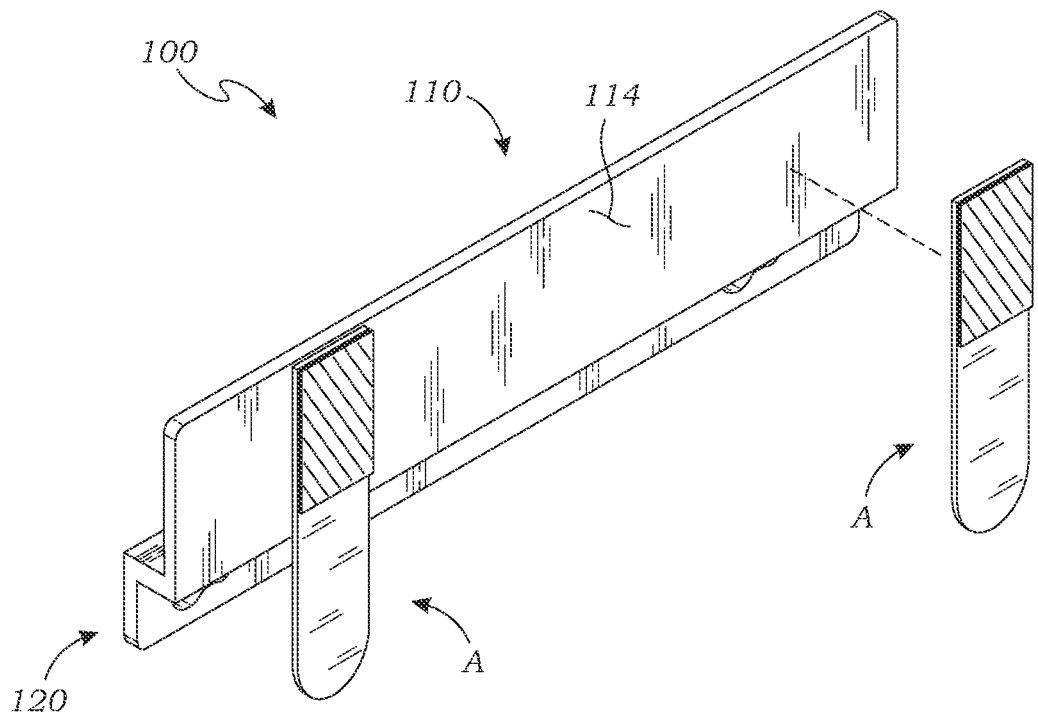
FIG. 10 is a rear and partially exploded perspective view thereof with two adhesive strips affixed thereto, in accordance with at least one embodiment.
Figure 11:
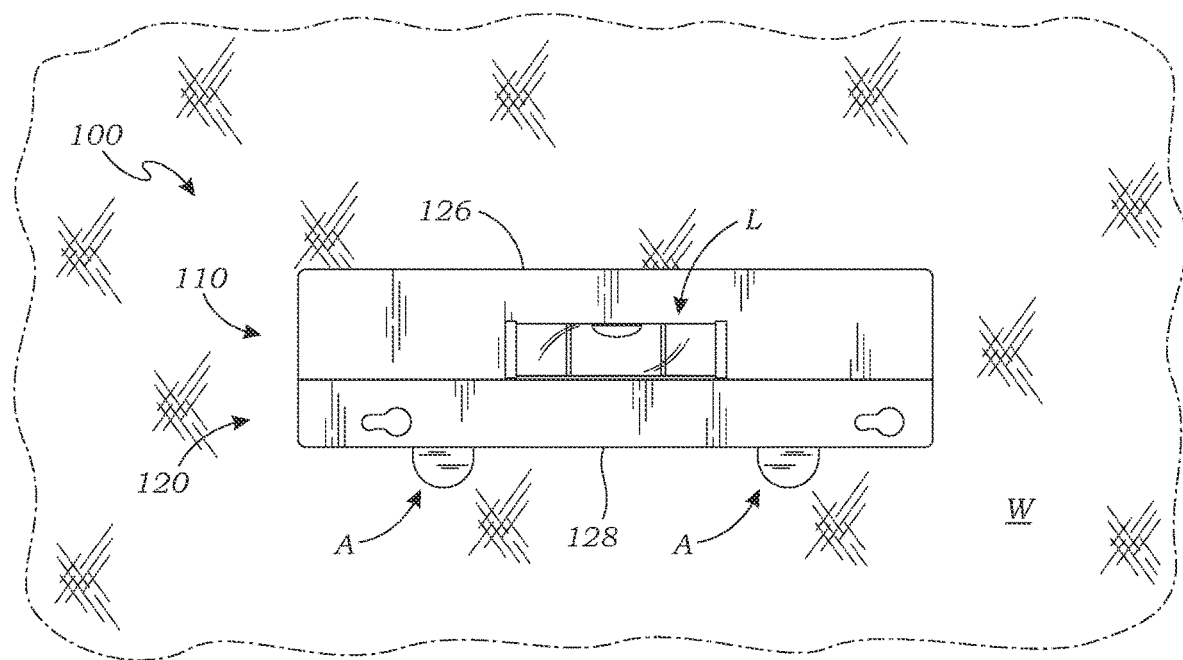
FIG. 11 is a front view thereof as installed on a wall in a first operational mode of the exemplary display system, in accordance with at least one embodiment.

Referring now to FIGS. 10 and 11, there are illustrated an exemplary method of mounting the exemplary mounting plate 100 on a wall W or other such typically vertical surface for use. First, as shown in FIG. 10, one or more adhesive strip(s) A may be installed on the rear surface 114 of the mounting plate body 110. In the exemplary embodiment, two such adhesive strips A are installed spaced apart along the body rear surface 114, with each such adhesive strip A configured as a two-sided adhesive foam or the like wherein one side can be stuck or affixed to the body rear surface 114 and the other adhesive side is configured to be stuck on a wall W or other surface upon removal of a release liner or the like in order to expose or activate the adhesive in a manner known in the art. One example of such an adhesive strip A is commonly referred to as a Command™ strip manufactured and sold by 3M Company for hanging pictures, posters, and other items on a wall. Indeed, each such adhesive strip A may be nominally rated to hold up to one to eight pounds or more, depending on the strip, and noting that each exemplary display plate 30 or mounting plate 100 nominally weighs only about one ounce or less, it follows that two of even the smallest or lowest weight rating adhesive strips A (each rated at one pound) would support a chain display 20 having up to thirty or more display plates 30 made of aluminum, plastic, or materials of similar density, while perhaps fewer plates 30 would be supported with such a minimal adhesive if of relatively higher density, such as stainless steel plates 30 weighing closer to three ounces each. With such adhesive strips A so adhered on the rear surface 114 of the mounting plate body 110 as shown in FIG. 10, to then install the mounting plate 100 on a wall W as shown in FIG. 11, each such adhesive strip A is activated by simply removing any release liner or other such peel-off layer from its back side and with the mounting plate 100 then brought adjacent to the wall W at the location it is to be installed, the mounting plate 100 and thus the adhesive strips A are pushed towards or against the wall W and held in place under pressure as per the strip manufacturer's recommendation until the strips A have adhered to the wall W so as to thus install the mounting plate 100 thereon. As shown, a bubble level L or the like may be employed at the step of installing the mounting plate 100 to ensure the mounting plate 100 is level. Conveniently, where the mounting plate 100 is configured as in the exemplary embodiment with a stepped flange 120 extending from the mounting plate body 110, the level L can be placed or nested on the mounting plate flange 120, though of course if the mounting plate 100 is flat or non-stepped its top or bottom edge 126, 128 can be used instead to seat the level L against and thereby ensure that the mounting plate 100 is installed level or square. With the mounting plate 100 so installed, it is ready for receipt of a display plate 30 in use of the overall display system 20 as illustrated below in connection with FIGS. 12-17. But first, it will be appreciated by those skilled in the art that while one or more adhesive strips A are shown and described as the means by which the mounting plate 100 is installed on a wall W or the like, the invention is not so limited and other mounting means now known or later developed may be employed. By way of further illustration and not limitation, glue or the like may be employed instead to install the mounting plate 100 on the wall W, though it will be appreciated that such is relatively more permanent, as compared to the double-sided adhesive strips such as the 3M Command™ strips that are known to be removable as by pulling down on the exposed tabs of the strips to stretch and deform the foam and thereby break the adhesive bond between the Command™ strip and the wall generally without any damage or permanent effect on the wall, with the Command™ strip similarly being removed from the back 114 of the mounting plate body 110 in the same manner. Such Command™ strips not only are not permanent or cause any damage but have the further advantage of not being visible when in use without any modification to the object being mounted, here the mounting plate 100. Alternatively, and by way of still further illustration and not limitation, the mounting plate body 110 may be formed having one or more through-holes (not shown) to facilitate its installation on a wall W as by nails, screws, or the like in a manner known in the art.

Figure 12:
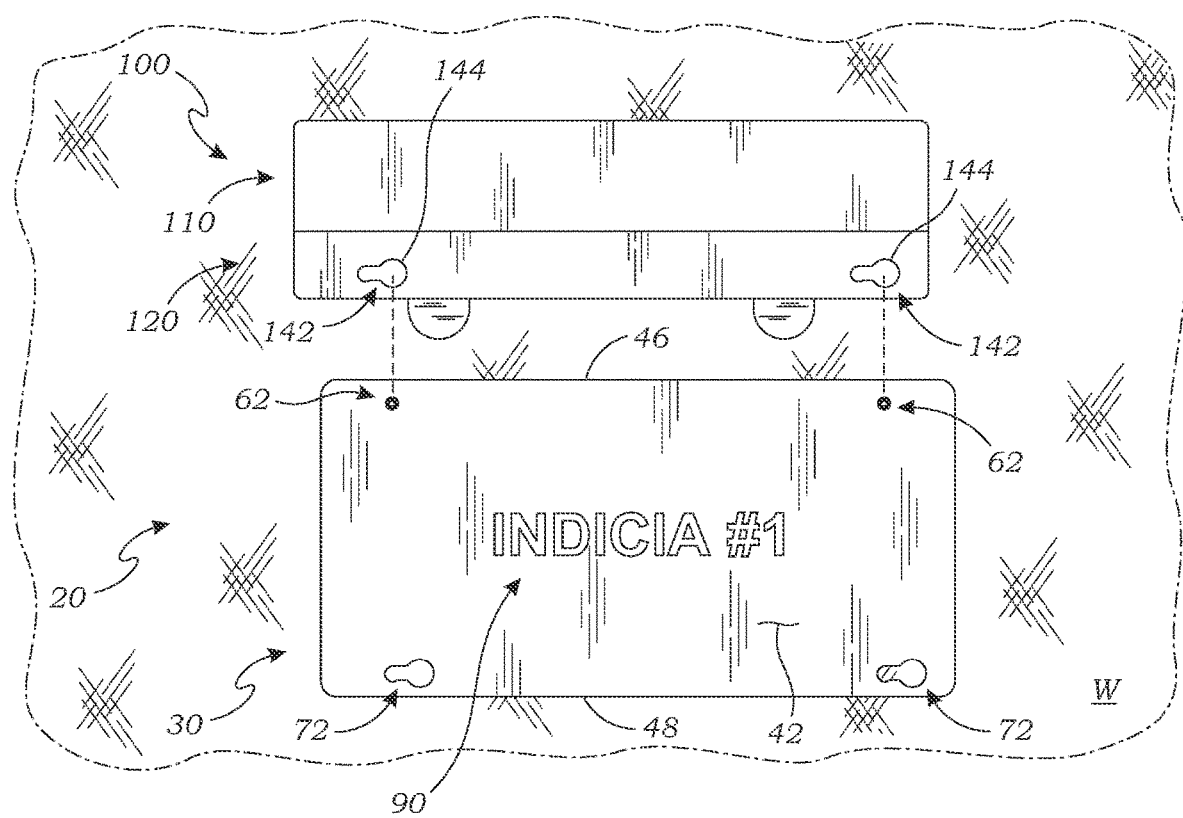
FIG. 12 is a front view thereof now with the exemplary display plate of FIGS. 1-6 being installed on the mounting plate of FIGS. 7-11 of the exemplary display system, in accordance with at least one embodiment.
Figure 13:
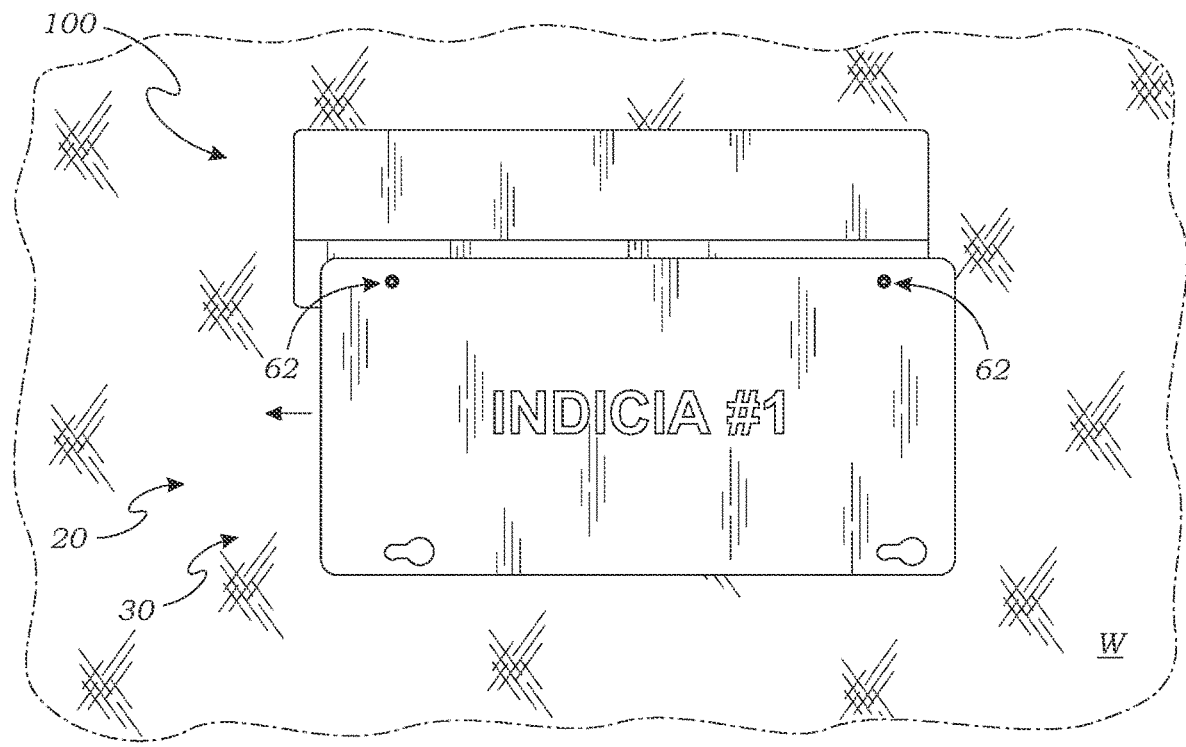
FIG. 13 is a further front view thereof with the exemplary display plate being installed on the mounting plate of the exemplary display system, in accordance with at least one embodiment.
Figure 14:
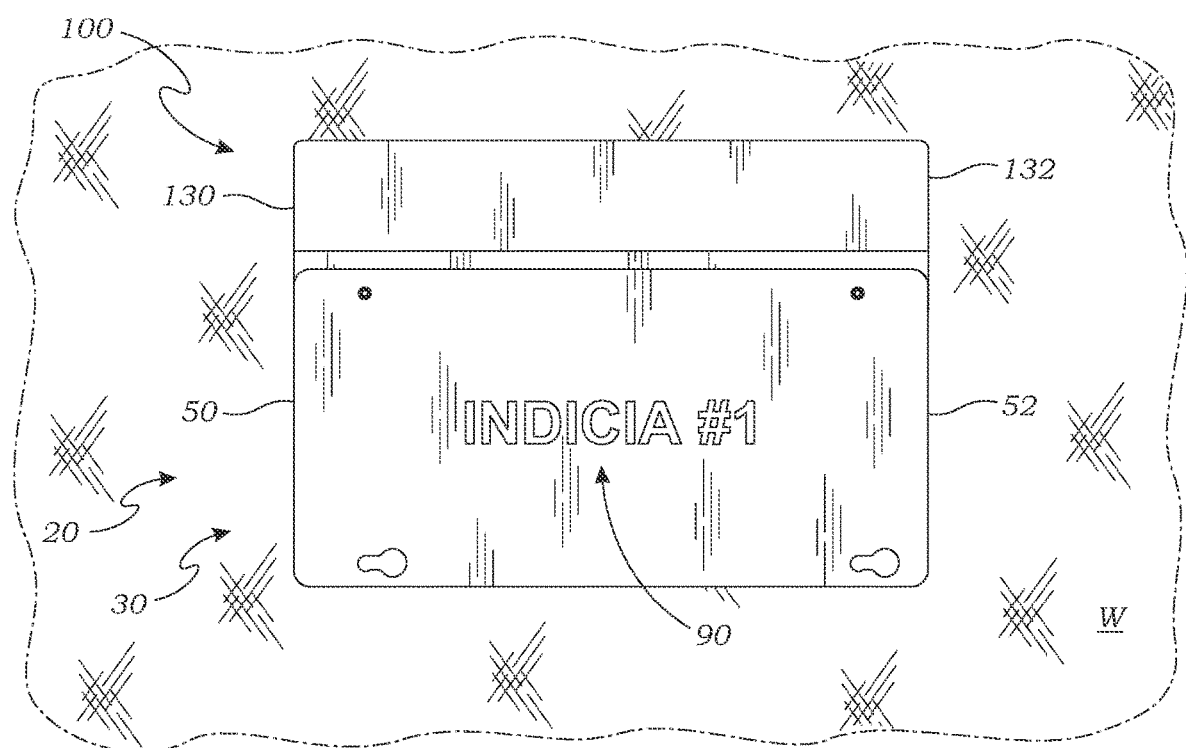
FIG. 14 is a still further front view thereof with the exemplary display plate fully installed on the mounting plate in a second operational mode of the exemplary display system, in accordance with at least one embodiment.
Figure 15:
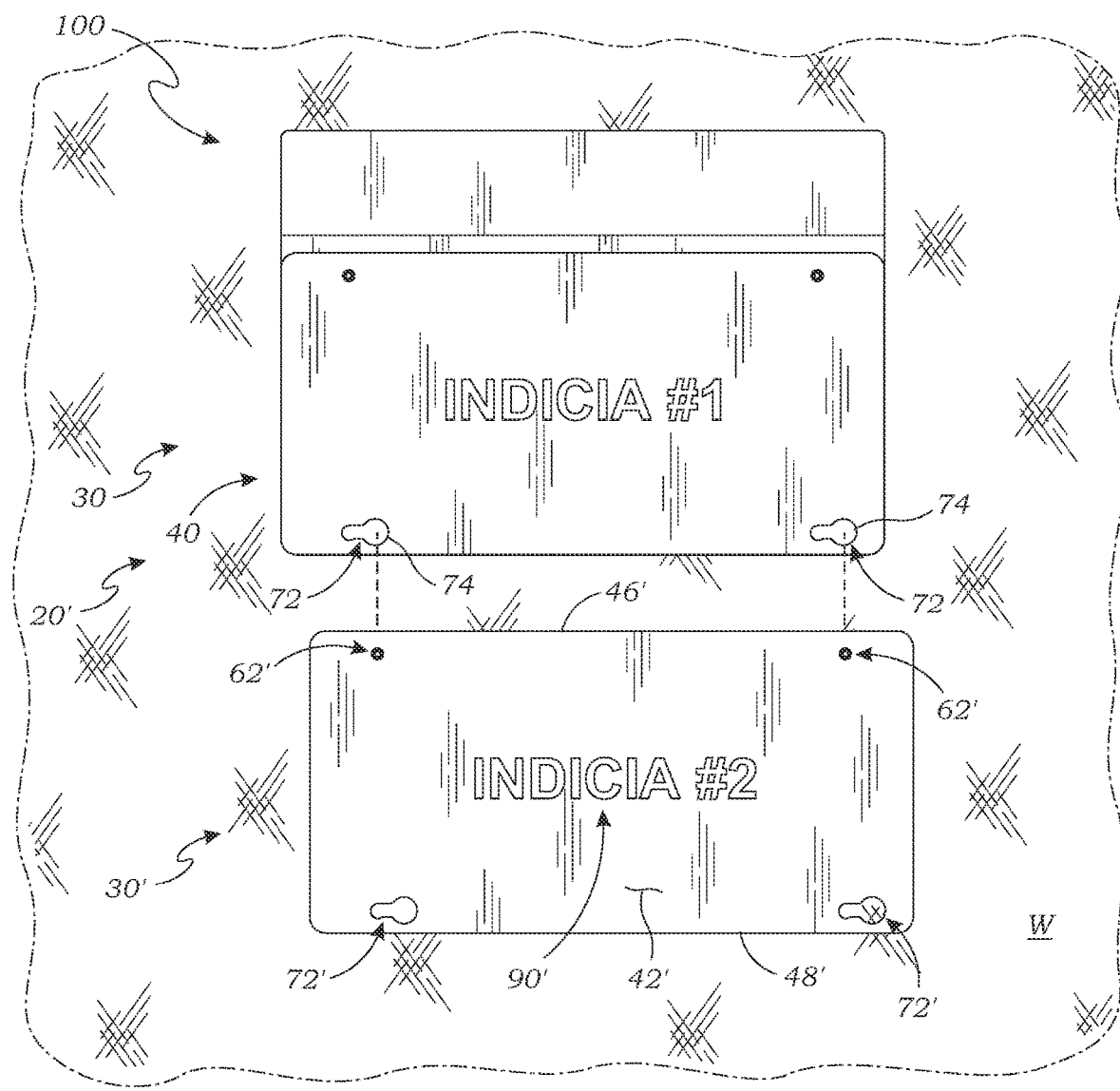
FIG. 15 is a front view thereof now with a second exemplary display plate being installed on the first exemplary display plate of the exemplary display system of FIG. 14, in accordance with at least one embodiment.

Turning next to FIGS. 12-17, in use of a display system 20 according to aspects of the present invention and with the starter strip or mounting plate 100 already installed on a wall W in a desired location as described above in connection with FIGS. 10 and 11, the first step as shown in FIG. 12 is to position a display plate 30 near the installed mounting plate 100 with the display plate 30 oriented facing out or away from the wall, or with the display plate body front surface 42 facing out and its opposite rear surface 44 (FIG. 2) facing the wall W such that the two rearwardly-oriented pins 62 are substantially aligned with the keyholes 142 formed in the mounting plate flange 120, and specifically the keyhole clearance 144 of each for the receipt therein of the respective pin head 64 (FIG. 2). As seen in FIG. 13, with the display plate 30 so oriented and aligned relative to the installed mounting plate 100, the display plate 30 is further shifted in the direction of the mounting plate 100 until the pins 62 enter the mounting plate keyholes 142 as herein described. Then, as shown in FIG. 14, when the display plate 30 is simply shifted to the left relative to the mounting plate 100 as indicated by the arrow in FIG. 13, the display plate pins 62 are thereby seated and retained within the mounting plate keyholes 142 and lastly into the optional detents 150, again as described herein. And those skilled in the art will appreciate based on the mounting plate 100 and display plate 30 being similarly configured, particularly as to their respective widths, and each having their pattern of pins 62 and/or keyholes 72, 142, and specifically their keyhole terminuses 78, 148, centered widthwise on the respective display plate and mounting plate bodies 40, 110, or more precisely in the exemplary embodiment the mounting plate flange 120, that the display plate 30 is thus centered on the mounting plate 100 when temporarily installed on or suspended or hung therefrom as shown in FIG. 14, or here more precisely the display plate 30 and the mounting plate 100 are thus substantially aligned at their respective side edges 50, 52, 130, 132, providing a clean and aesthetically-pleasing appearance of the display system 20. In like fashion, with reference to FIGS. 15-17, a second display plate 30' may next be installed serially in the chain as by hanging the second display plate 30' from the first display plate 30 that is already hung on the mounting plate 100 as shown in FIG. 14. The first step as shown in FIG. 15 is to then position the second display plate 30' near the installed mounting plate 100 and first display plate 30 with the second display plate 30' again oriented facing out or away from the wall, or with the display plate body front surface 42' facing out and its opposite rear surface 44' (FIG. 2) facing the wall W such that the two rearwardly-oriented pins 62' are substantially aligned with the keyholes 72 formed in the first display plate body 40, and specifically the keyhole clearance 74 of each for the receipt therein of the respective pin head 64' (FIG. 2).

Figure 16:
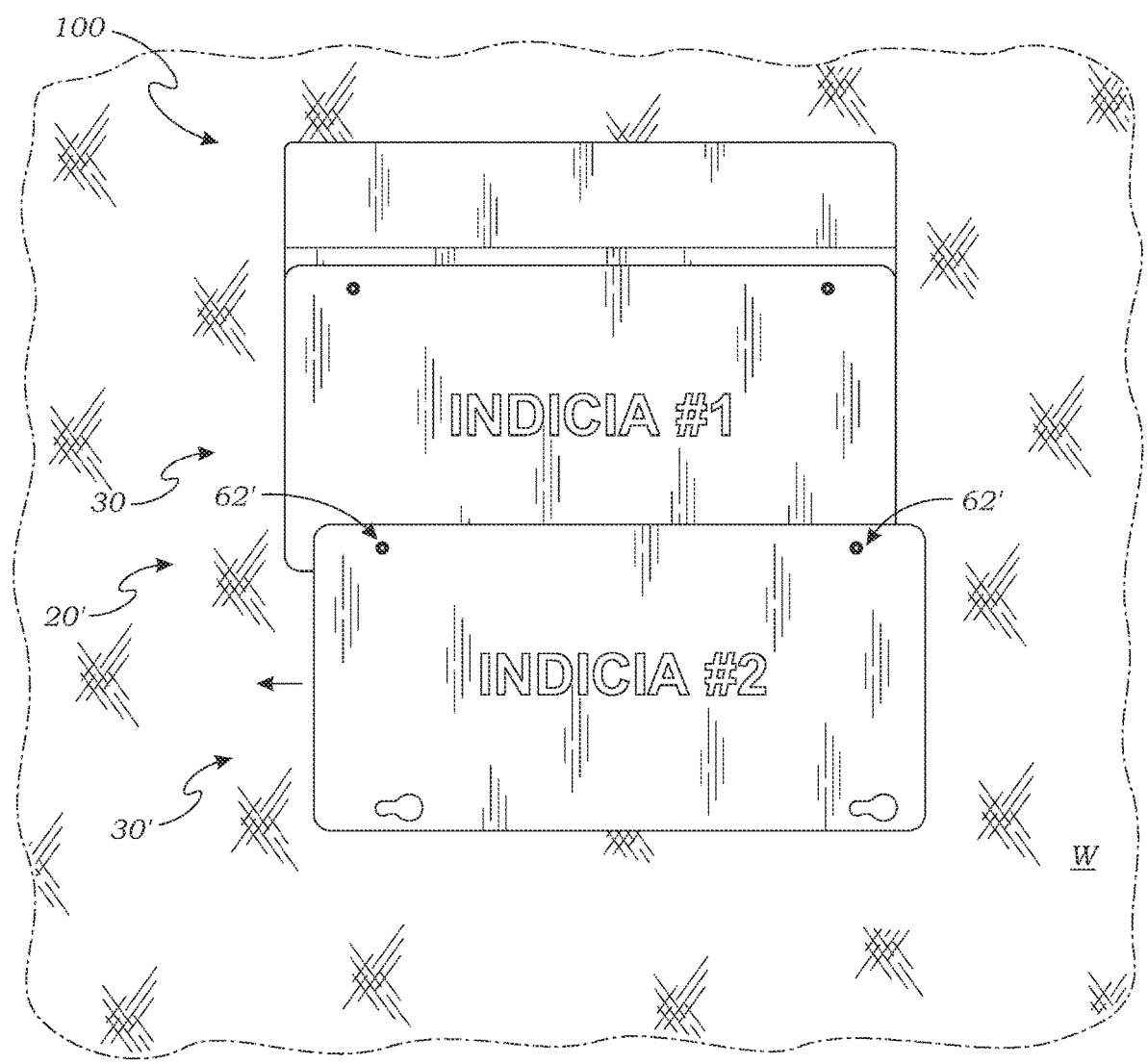
FIG. 16 is a further front view thereof with the second exemplary display plate being installed on the first exemplary display plate of the exemplary display system, in accordance with at least one embodiment.
Figure 17:
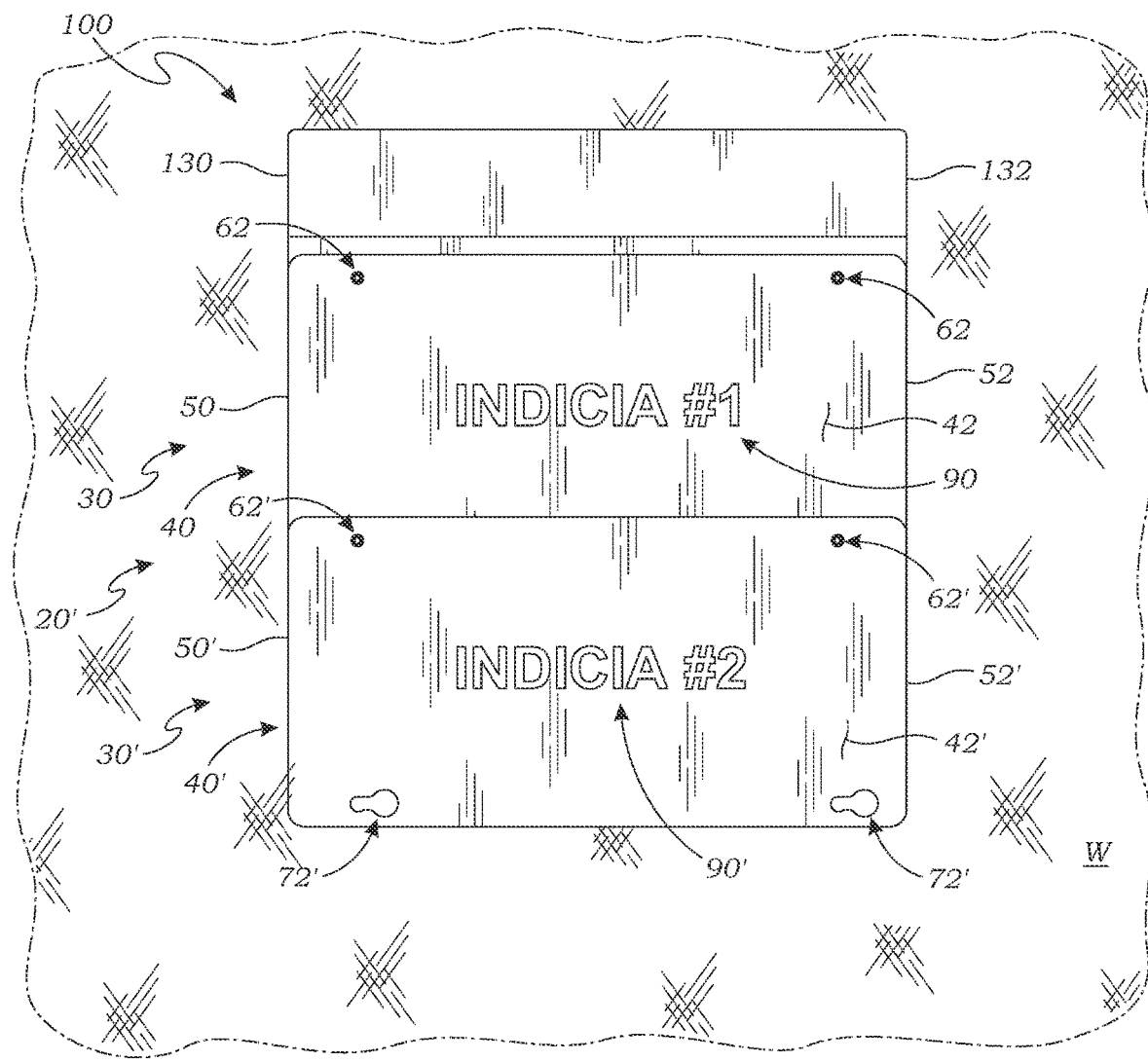
FIG. 17 is a still further front view thereof with the second exemplary display plate fully installed on the first exemplary display plate in a third operational mode of the exemplary display system, in accordance with at least one embodiment.

As seen in FIG. 16, with the second display plate 30' so oriented and aligned relative to the installed mounting plate 100 and first display plate 30, the second display plate 30' is further shifted in the direction of the first display plate 30 until the pins 62' enter the display plate keyholes 72 as herein described. Then, as shown in FIG. 17, when the second display plate 30' is simply shifted to the left relative to the mounting plate 100 and the first display plate 30 as indicated by the arrow in FIG. 16, the display plate pins 62' are thereby seated and retained within the first display plate keyholes 72 and lastly into the optional detents 80, again as described herein. And those skilled in the art will once again appreciate based on the mounting plate 100 and the display plates 30, 30' being similarly configured, particularly as to their respective widths, and here each display plate 30, 30' having its pattern of pins 62, 62' and keyholes 72, 72', and specifically their keyhole terminuses 78, 78', centered widthwise on the respective display plate bodies 40, 40' that the second display plate 30' is once again centered on the first display plate 30 and hence the mounting plate 100 when temporarily installed or hung as shown in FIG. 17, or here more precisely the first and second display plates 30, 30' and the mounting plate 100 are thus substantially aligned at their respective side edges 50', 52', 50, 52, 130, 132, providing a nice, uniform appearance of the display system 20' even as further display plates 30, 30' etc. are hung in series in like fashion to form an easily evolving or updated display system 20, 20' according to aspects of the present invention. Accordingly, it will be appreciated that multiple such display plates 30, 30' may thus be mounted on a single mounting plate 100 as part of or in forming or defining a display system 20, 20' according to aspects of the present invention. And once more, such may be accomplished employing other temporary installation or assembly means beyond those shown and described herein without departing from the spirit and scope of the invention. But in connection with the exemplary interconnecting means fashioned as pin and keyhole engagement between the components or mounting and display plates 100, 30, 30', it will be further appreciated that due to the engagement particularly of each pin head 64, 64' within a respective keyhole 142, 72, 72', and particularly the slot 146, 76, 76' (FIGS. 4 and 7) and terminus 148, 78, 78' (FIGS. 4 and 7) of each, with or without the detent 150, 80, 80' (FIGS. 4 and 7), the plates 30, 30' are effectively locked together or not easily separated or disconnected unintentionally or accidentally. Once more, those skilled in the art will appreciate that such may be accomplished employing various other configurations of the exemplary pin and keyhole engagement or other such temporary engagement means now known or later developed, such that the exemplary display system 20, 20' and its related components are to be understood as illustrative and non-limiting except where indicated otherwise as to a particular embodiment such as the herein illustrated display and mounting plates 30, 100.

With continued reference to FIGS. 12-17 and particularly FIG. 17 showing two display plates 30, 30' hung in series on a single installed mounting plate 100, there is shown a first indicia 90 placed on the front surface 42 of the first display plate body 40 and a second indicia 90' placed on the front surface 42' of the second display plate body 40'. It will be appreciated that based on the configurations of the display plates 30, 30' and particularly the locations of the respective pins 62, 62' and keyholes 72, 72' near the respective top and bottom plate edges 46, 46', 48, 48', in the exemplary embodiment each approximately 0.150" on center from the respective edge, there is thus relatively minimal overlap of the display plate bodies 40, 40' such that most of the front surface 42, 42' remains visible even with the display plates 30, 30' interconnected again as best seen in FIG. 17. As such, those skilled in the art will appreciate that a substantial portion of the plate front surfaces 42, 42' is a printable or markable area for such indicia 90, 90' as indicated, which as a practical matter could be virtually any text or graphics in one or more colors, fonts, designs, etc. to award, recognize, commemorate or otherwise record for such display an achievement of some kind. And by denoting or capturing each such achievement in a relatively small area, here nominally 2"×4" in the exemplary embodiment, it will be appreciated that a large number of such awards or recognitions may be displayed within a single, relatively small display system 20, 20' according to aspects of the present invention—again, in the exemplary embodiment, upwards of thirty or more plates 30, 30' may be installed on or hung from a single, relatively minimally secured mounting plate 100. Thus, there is provided a convenient, easy to use, versatile award or recognition display system 20, 20' according to aspects of the present invention in whatever particular form or configuration it takes such as disclosed herein. As for each indicia 90, 90' itself, such may be formed on or applied to the front surface 42, 42' of each display plate body 40, 40' employing any appropriate process or technique now known or later developed, including but not limited to engraving, laser marking or engraving, UV printing, ink or other printing, silk screening, painting, or applying a decal, sticker, applique, or the like. It is also noted that though not shown, any such indicia may also be placed on the mounting plate 100, particularly the front surface 112 of the mounting plate body 110. By way of further illustration and not limitation, an individual's name could be placed on the mounting plate 100 with each display plate 30, 30' hung thereon representing various accomplishments or achievements of that individual. Or by way of still further illustration and not limitation, a team name or logo could be placed on the mounting plate 100 with a display plate 30, 30' then hung on such mounting plate 100 representative of each member of that particular team and perhaps that member's jersey number, position, and/or achievement(s) or other notable(s). Again, a display system 20, 20' according to aspects of the present invention may take a number of forms to suit a wide variety of contexts or uses without departing from its spirit and scope.

Figure 18:
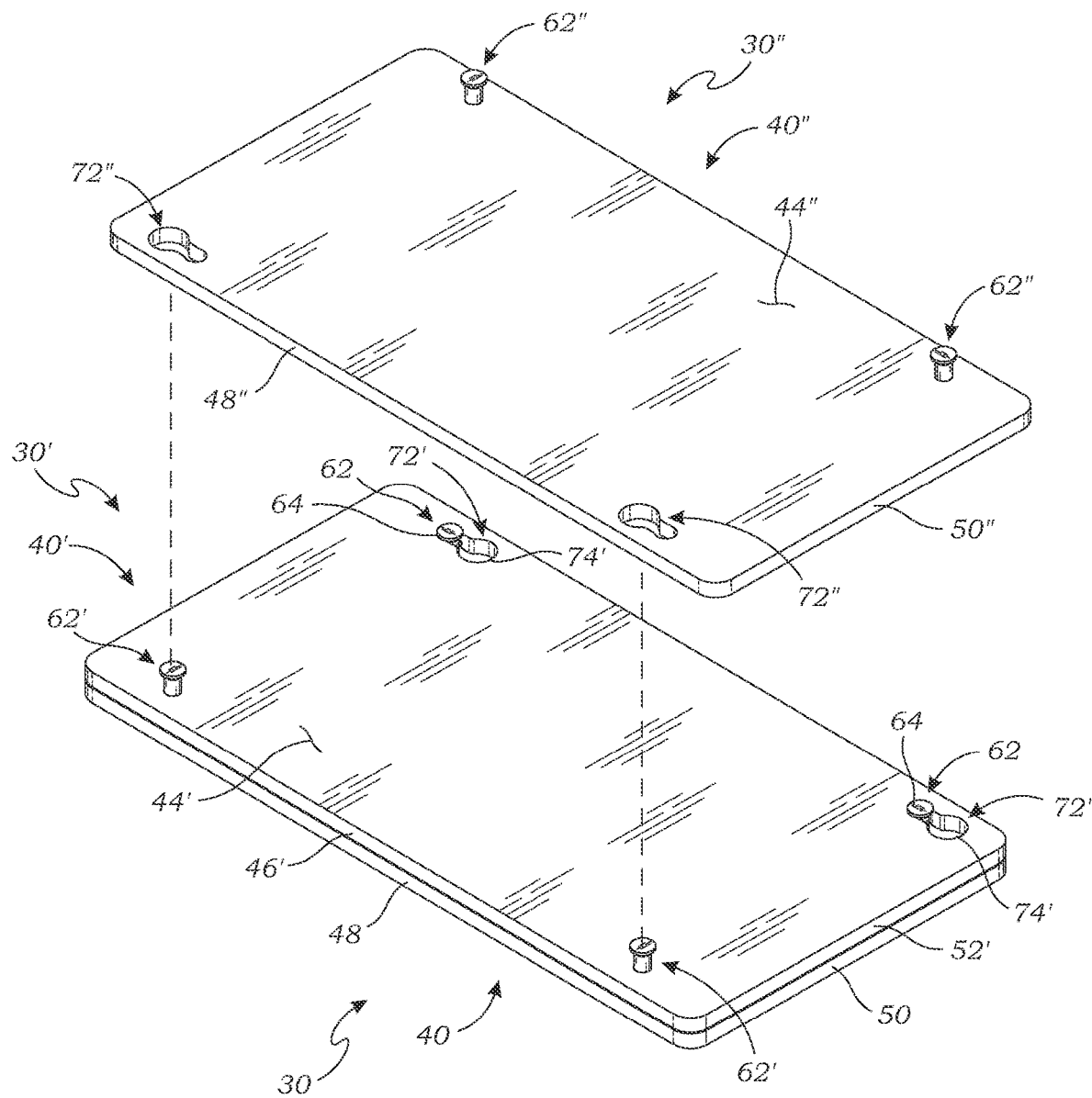
FIG. 18 is a front and partially exploded perspective view of a plurality of exemplary display plates of an exemplary display system being stacked together, in accordance with at least one embodiment.

Finally, turning to FIG. 18, there is shown a perspective view of three exemplary display plates 30, 30', 30" being interconnected in a stacked configuration as for shipping or storage of such plates 30, 30', 30". As can be seen, because the plates 30, 30', 30" are uniform and symmetrical in construction with regard to pin locations and terminus centers, the pins of one plate can engage with the keyholes of the next one in alternating fashion so as to link all the plates 30, 30', 30" in an interlocked stack with all perimeters of the plates 30, 30', 30" substantially aligned. In a bit more detail, a first display plate 30 may be oriented with its rear surface 44 (FIG. 2) and thus its pins 62 facing up or toward the next plate 30'. The second display plate 30' in series is then oriented with its front surface 42' (FIG. 1) down or toward the rear surface 44 of the first display plate 30 but rotated one-hundred-eighty degrees (180°) relative to the first display plate 30 so that the second plate keyholes 72' are aligned with the first plate pins 62. The first and second display plates 30, 30' are then engaged or interconnected in a manner as described herein as by first passing the first plate pins 62 and specifically the pin heads 64 through the larger keyhole clearance 74' of the respective second plate keyhole

72' and then once the pins 62 are in position as by the rear surface 44 of the first display plate 30 and the front surface 42' of the second display plate 30' being substantially adjacent, the plates 30, 30' are slid laterally relative to each other to seat the pins 62 within the keyholes 72', thereby again interconnecting the first and second display plates 30, 30' as shown. In like fashion, the third display plate 30" in series is coupled with the second display plate 30' as by orienting the third display plate 30" with its front surface 42" (FIG. 1) down or toward the rear surface 44' of the second display plate 30' but again rotated one-hundred-eighty degrees (180°) relative to the second display plate 30', or here back into the same rotational orientation as the first display plate 30, so that the third plate keyholes 72" are aligned with the second plate pins 62' with the second and third display plates 30', 30" then engaged or interconnected in a manner as described herein. Those skilled in the art will appreciate that such alternating interlinking of display plates 30, 30', 30" can continue indefinitely, resulting in a nice uniform stack of interconnected plates 30, 30', 30", etc. Relatedly, once more, due to the uniformity and symmetry of the plates 30, 30', 30", as shown in FIG. 18, the edges of each are substantially aligned in the stack, namely, the top or bottom long edges 48, 46', 48" and the side or short edges 50, 52', 50", again, contributing to the uniform or aligned appearance of the stack of plates 30, 30', 30". It will be appreciated by those skilled in the art that the same can be accomplished in reverse in the exemplary embodiment of the plates 30, 30', 30" as by orienting each with its pins 62, 62', 62" down. Of course, in other alternative embodiments of the plates and particularly any interconnecting means, the resulting process of interconnecting the plates serially in a stack would be adapted accordingly, again facilitated by the uniformity and symmetry of the plates 30, 30', 30" generally and the respective engagement therebetween as in a pin-hole, male-female, or other such complimentary interconnection.

Aspects of the present specification may also be described as follows:

1. A display system comprising: a mounting plate configured for being secured on a wall, the mounting plate comprising a mounting plate body and a mounting plate connector formed on or in the mounting plate body; and a first display plate configured for being removably installed on the mounting plate, the first display plate comprising a first display plate body and a first display plate first connector formed on or in the first display plate body and a first display plate second connector formed on or in the first display plate body offset from the first display plate first connector, the first display plate first connector configured for selectively engaging the mounting plate connector, the first display plate body having a first indicia formed thereon, whereby upon securing the mounting plate on the wall and removably installing the first display plate on the mounting plate as by engaging the first display plate first connector with the mounting plate connector the first indicia formed on the first display plate body is visible.

2. The system of embodiment 1 further comprising: a second display plate configured for being removably installed on the first display plate, the second display plate comprising a second display plate body and a second display plate first connector formed on or in the second display plate body and a second display plate second connector formed on or in the second display plate body offset from the second display plate first connector, the second display plate first connector configured for selectively engaging the first display plate second connector, the second display plate body having a second indicia formed thereon, whereby upon further removably installing the second display plate on the first display plate as by engaging the second display plate first connector with the first display plate second connector the first indicia formed on the first display plate body and the second indicia formed on the second display plate body are visible.

3. The system of embodiment 1 or embodiment 2 wherein: the first display plate first connector is formed as at least one first display plate pin; and the mounting plate connector is formed as at least one mounting plate keyhole configured for selective receipt of the at least one first display plate pin.

4. The system of embodiment 2 or embodiment 3 wherein: the second display plate first connector is formed as at least one second display plate pin; and the first display plate second connector is formed as at least one first display plate keyhole configured for selective receipt of the at least one second display plate pin.

5. The system of any of embodiments 2-4 wherein the second display plate second connector is formed as at least one second display plate keyhole.

6. The system of any of embodiments 1-5 wherein: the first display plate first connector is formed as a pair of spaced-apart first display plate pins; and the mounting plate connector is formed as a pair of spaced-apart mounting plate keyholes configured for selective receipt of the respective first display plate pins.

7. The system of any of embodiments 2-6 wherein: the second display plate first connector is formed as a pair of spaced-apart second display plate pins; and the first display plate second connector is formed as a pair of spaced-apart first display plate keyholes configured for selective receipt of the respective second display plate pins.

8. The system of any of embodiments 2-7 wherein the second display plate second connector is formed as a pair of spaced-apart second display plate keyholes.

9. The system of embodiment 8 wherein distances between the mounting plate keyholes, between the first display plate pins, between the first display plate keyholes, between the second display plate pins, and between the second display plate keyholes are substantially equal.

10. The system of embodiment 9 wherein the distances between the mounting plate keyholes, between the first display plate pins, between the first display plate keyholes, between the second display plate pins, and between the second display plate keyholes are between 3.085 inches and 3.115 inches.

11. The system of any of embodiments 7-10 wherein each of the first display plate pins and the second display plate pins comprise a pin shaft and a pin head formed on the pin shaft.

12. The system of embodiment 11 wherein: the first display plate body comprises a first front surface, an opposite first rear surface, a first top edge, an opposite first bottom edge, and opposite first side edges interconnecting the first top and bottom edges; the second display plate body comprises a second front surface, an opposite second rear surface, a second top edge, an opposite second bottom edge, and opposite second side edges interconnecting the second top and bottom edges; the first display plate pins and the second display plate pins are positioned on the respective first display plate body and second display plate body such that the pin heads are spaced from the respective first rear surface and second rear surface; and the first indicia and the second indicia are formed on the respective first front surface and second front surface.

13. The system of embodiment 12 wherein the first display plate pins and the second display plate pins are positioned on the respective first display plate body and second display plate body such that each pin shaft is substantially equidistant from the respective first side edges and second side edges.

14. The system of embodiment 12 or embodiment 13 wherein the first display plate pins and the second display plate pins are positioned on the respective first display plate body and second display plate body such that the pin shafts are near to and substantially equidistant from the respective first top edge and second top edge.

15. The system of any of embodiments 12-14 wherein: spaced-apart first display plate pinholes are formed in the first display plate body for receipt of the first display plate pins; spaced-apart second display plate pinholes are formed in the second display plate body for receipt of the second display plate pins; and the first display plate pinholes and the second display plate pinholes are formed in the respective first display plate body and second display plate body such that the first and second display plate pinholes are near to and substantially equidistant from the respective first top edge and second top edge and each first and second display plate pinhole is substantially equidistant from the respective first side edges and second side edges.

16. The system of any of embodiments 8-15 wherein each of the mounting plate keyholes, the first display plate keyholes, and the second display plate keyholes comprise a keyhole clearance and an opposite keyhole terminus interconnected by a keyhole slot.

17. The system of embodiment 16 wherein a keyhole detent is formed in each keyhole terminus for selective receipt of the respective pin shaft.

18. The system of any of embodiments 8-17 wherein the first display plate keyholes and the second display plate keyholes are formed in the respective first display plate body and second display plate body so as to communicate between the first front and rear surfaces and the second front and rear surfaces respectively.

19. The system of any of embodiments 11-18 wherein: the mounting plate body comprises a mounting plate body front surface and an opposite mounting plate body rear surface, a mounting plate flange extending from the mounting plate body and having an offset mounting plate flange front surface and an opposite offset mounting plate flange rear surface, a mounting plate top edge, an opposite mounting plate bottom edge, and opposite mounting plate side edges interconnecting the mounting plate top and bottom edges; and the mounting plate keyholes are formed in the mounting plate flange so as to communicate between the mounting plate flange front and rear surfaces.

20. The system of embodiment 19 wherein: the mounting plate flange front surface and the mounting plate flange rear surface define a mounting plate flange thickness of the mounting plate flange; and the pin heads are spaced from the first rear surface of the first display plate by an amount greater than the mounting plate flange thickness.

21. The system of embodiment 19 or embodiment 20 wherein the mounting plate keyholes are positioned in the mounting plate flange such that each keyhole terminus is substantially equidistant from the mounting plate side edges, whereby upon removably installing the first display plate on the mounting plate as by engaging the first display plate pins with the mounting plate keyholes the respective mounting plate side edges and first side edges are aligned.

22. The system of any of embodiments 12-21 wherein: the first front surface and the first rear surface define a first thickness of the first display plate body; the second front surface and the second rear surface define a second thickness of the second display plate body; and the first and second thicknesses are substantially equal.

23. The system of embodiment 22 wherein the pin heads are spaced from the respective first rear surface and second rear surface by an amount greater than the respective first and second thicknesses.

24. The system of any of embodiments 16-23 wherein the diameter of the pin head is less than the keyhole clearance and greater than the keyhole terminus and the keyhole slot, whereby the pin head may pass through the keyhole clearance and be retained by the keyhole slot and the keyhole terminus.

25. The system of any of embodiments 16-24 wherein the first display plate keyholes and the second display plate keyholes are positioned in the respective first display plate body and second display plate body such that each keyhole terminus is substantially equidistant from the respective first side edges and second side edges and aligned with the respective first display plate pins and second display plate pins, whereby upon removably installing the second display plate on the first display plate as by engaging the second display plate pins with the first display plate keyholes the respective first side edges and second side edges are aligned.

26. The system of any of embodiments 16-25 wherein the first display plate keyholes and the second display plate keyholes are positioned in the respective first display plate body and second display plate body such that the keyhole terminuses are near to and substantially equidistant from the respective first bottom edge and second bottom edge, whereby upon removably installing the second display plate on the first display plate the first indicia formed on the first display plate body is not obscured by the second display plate body.

27. The system of any of embodiments 2-26 wherein the mounting plate, the first display plate, and the second display plate are made of the same material.

28. The system of any of embodiments 2-26 wherein two or more of the mounting plate, the first display plate, and the second display plate are made of different materials.

29. The system of any of embodiments 2-28 wherein the mounting plate, the first display plate, and the second display plate are each made of a material selected from the group consisting of aluminum, steel, titanium, brass, alloy, polypropylene, polystyrene, polyvinyl chloride ("PVC"), acrylonitrile butadiene styrene ("ABS"), high density polyethylene ("HDPE"), low density polyethylene ("LDPE"), polycarbonate, polyurethane, thermoplastic, thermosetting polymer, wood, resin, and glass.

30. The system of any of embodiments 2-29 wherein the mounting plate, the first display plate, and the second display plate have the same surface treatment.

31. The system of any of embodiments 2-29 wherein two or more of the mounting plate, the first display plate, and the second display plate have different surface treatment.

32. The system of any of embodiments 2-31 wherein the mounting plate, the first display plate, and the second display plate each have one or more surface treatment selected from the group consisting of tumbling, bead blasting, grit blasting, grinding, deburring, sanding, buffing, anodizing, dip-molding, dip-coating, powder-coating, chromate conversion coating, sealing, passivating, plating, and painting.

33. The system of any of embodiments 2-32 wherein the first indicia and the second indicia are different.

34. The system of any of embodiments 2-33 wherein the first indicia and the second indicia are formed through a process selected from the group consisting of engraving, laser marking, laser engraving, UV printing, ink printing, silk screening, painting, and applying a decal, sticker, or applique.

35. A method of employing a display system as defined in any one of embodiments 1-34, the method comprising the steps of: securing the mounting plate on the wall; and installing the first display plate on the mounting plate as by engaging the first display plate first connector with the mounting plate connector to display the first indicia.

36. The method of embodiment 35 wherein the step of securing the mounting plate on the wall comprises the further steps of: installing an adhesive strip on the mounting plate body rear surface; activating the adhesive strip; and pushing the mounting plate body and adhesive strip against the wall.

37. The method of embodiment 36 employing two adhesive strips at opposite ends of the mounting plate body.

38. The method of embodiment 36 or embodiment 37, concurrently with the step of pushing the mounting plate body and adhesive strip against the wall, comprising the further step of positioning a level on the mounting plate.

39. The method of any of embodiments 35-38 wherein the step of installing the first display plate on the mounting plate comprises the further steps of: positioning the first display plate pins defining the first display plate first connector near the mounting plate keyholes defining the mounting plate connector; moving the first display plate toward the mounting plate so as to pass the first display plate pins into the keyhole clearances of the mounting plate keyholes; and shifting the first display plate laterally relative to the mounting plate so as to shift the first display plate pins into the keyhole terminuses of the mounting plate keyholes.

40. The method of any of embodiments 35-39, prior to the step of installing the first display plate on the mounting plate, further comprising the step of forming the first indicia on the first front surface of the first display plate body.

41. The method of any of embodiments 35-40, comprising the further step of installing the second display plate on the first display plate as by engaging the second display plate first connector with the first display plate second connector to display the second indicia.

42. The method of embodiment 41 wherein the step of installing the second display plate on the first display plate comprises the further steps of: positioning the second display plate pins defining the second display plate first connector near the first display plate keyholes defining the first display plate second connector; moving the second display plate toward the first display plate so as to pass the second display plate pins into the keyhole clearances of the first display plate keyholes; and shifting the second display plate laterally relative to the first display plate so as to shift the second display plate pins into the keyhole terminuses of the first display plate keyholes.

43. The method of embodiment 41 or embodiment 42, prior to the step of installing the second display plate on the first display plate, further comprising the step of forming the second indicia on the second front surface of the second display plate body.

44. A kit comprising a display system as defined in any one of embodiments 1-34.

45. The kit of embodiment 44 comprising one mounting plate and at least two display plates.

46. The kit of embodiment 44 or embodiment 45 further comprising at least one adhesive strip.

47. The kit of any of embodiments 44-46 further comprising a level.

48. The kit of any of embodiments 44-47 further comprising instructional material.

49. The kit of embodiment 48, wherein the instructional material provides instructions on how to perform the method as defined in any one of embodiments 35-43.

50. Use of a display system as defined in any one of embodiments 1-34 to display awards or recognition.

51. The use of embodiment 50, wherein the use comprises a method as defined in any one of embodiments 35-43.

In closing, regarding the exemplary embodiments of the present invention as shown and described herein, it will be appreciated that a display system is disclosed and configured for displaying awards or recognition. Because the principles of the invention may be practiced in a number of configurations beyond those shown and described, it is to be understood that the invention is not in any way limited by the exemplary embodiments, but is generally able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention, except where indicated otherwise for a particular embodiment.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A display system for displaying awards or recognition, the system comprising:
a mounting plate configured for being secured on a wall, the mounting plate comprising a mounting plate body and a pair of spaced-apart mounting plate keyholes formed in the mounting plate body, the mounting plate body comprising a mounting plate body front surface and an opposite mounting plate body rear surface, a mounting plate flange extending from the mounting plate body and having an offset mounting plate flange front surface and an opposite offset mounting plate flange rear surface, a mounting plate top edge, an opposite mounting plate bottom edge, and opposite mounting plate side edges interconnecting the mounting plate top and bottom edges;
a first display plate configured for being removably installed on the mounting plate, the first display plate comprising a first display plate body and a pair of spaced-apart first display plate pins formed on the first display plate body and a pair of spaced-apart first display plate keyholes formed in the first display plate body offset from the first display plate pins, the first display plate pins configured for selectively engaging the mounting plate keyholes, the first display plate body comprising a first front surface, an opposite first rear surface, a first top edge, an opposite first bottom edge, and opposite first side edges interconnecting the first top and bottom edges and having a first indicia formed on the first front surface; and
a second display plate configured for being removably installed on the first display plate, the second display plate comprising a second display plate body and a pair of spaced-apart second display plate pins formed on the second display plate body and a pair of spaced-apart second display plate keyholes formed in the second display plate body offset from the second display plate pins, the second display plate pins configured for selectively engaging the first display plate keyholes, the second display plate body comprising a second front surface, an opposite second rear surface, a second top edge, an opposite second bottom edge, and opposite second side edges interconnecting the second top and bottom edges and having a second indicia formed on the second front surface,
wherein each of the first display plate pins and the second display plate pins comprise a pin shaft and a pin head formed on the pin shaft;

wherein the first display plate pins and the second display plate pins are positioned on the respective first display plate body and second display plate body such that the pin heads are spaced from the respective first rear surface and second rear surface and each pin shaft is substantially equidistant from the respective first side edges and second side edges and near to and substantially equidistant from the respective first top edge and second top edge;

wherein each of the mounting plate keyholes, the first display plate keyholes, and the second display plate keyholes comprise a keyhole clearance and an opposite keyhole terminus interconnected by a keyhole slot;

wherein the first display plate keyholes and the second display plate keyholes are formed in the respective first display plate body and second display plate body so as to communicate between the first front and rear surfaces and the second front and rear surfaces respectively; and wherein the mounting plate keyholes are formed in the mounting plate flange so as to communicate between the mounting plate flange front and rear surfaces, whereby upon securing the mounting plate on the wall and removably installing the first display plate on the mounting plate as by engaging the first display plate pins with the mounting plate keyholes and removably installing the second display plate on the first display plate as by engaging the second display plate pins with the first display plate keyholes the first indicia formed on the first display plate body and the second indicia formed on the second display plate body are visible.

2. The system of claim 1 wherein distances between the mounting plate keyholes, between the first display plate pins, between the first display plate keyholes, between the second display plate pins, and between the second display plate keyholes are substantially equal.

3. The system of claim 2 wherein the distances between the mounting plate keyholes, between the first display plate pins, between the first display plate keyholes, between the second display plate pins, and between the second display plate keyholes are between 3.085 inches and 3.115 inches.

4. The system of claim 1 wherein:
spaced-apart first display plate pinholes are formed in the first display plate body for receipt of the first display plate pins;
spaced-apart second display plate pinholes are formed in the second display plate body for receipt of the second display plate pins; and
the first display plate pinholes and the second display plate pinholes are formed in the respective first display plate body and second display plate body such that the first and second display plate pinholes are near to and substantially equidistant from the respective first top edge and second top edge and each first and second display plate pinhole is substantially equidistant from the respective first side edges and second side edges.

5. The system of claim 1 wherein a keyhole detent is formed in each keyhole terminus for selective receipt of the respective pin shaft.

6. The system of claim 1 wherein the first display plate keyholes and the second display plate keyholes are formed in the respective first display plate body and second display plate body so as to communicate between the first front and rear surfaces and the second front and rear surfaces respectively.

7. The system of claim 1 wherein:
the mounting plate flange front surface and the mounting plate flange rear surface define a mounting plate flange thickness of the mounting plate flange; and
the pin heads of the first display plate pins are spaced from the first rear surface by an amount greater than the mounting plate flange thickness.

8. The system of claim 1 wherein the mounting plate keyholes are positioned in the mounting plate flange such that each keyhole terminus is substantially equidistant from the mounting plate side edges, whereby upon removably installing the first display plate on the mounting plate as by engaging the first display plate pins with the mounting plate keyholes the respective mounting plate side edges and first side edges are aligned.

9. The system of claim 1 wherein:
the first front surface and the first rear surface define a first thickness of the first display plate body;
the second front surface and the second rear surface define a second thickness of the second display plate body; and
the first and second thicknesses are substantially equal.

10. The system of claim 9 wherein the pin heads are spaced from the respective first rear surface and second rear surface by an amount greater than the respective first and second thicknesses.

11. The system of claim 9 wherein the diameter of the pin head is less than the keyhole clearance and greater than the keyhole terminus and the keyhole slot, whereby the pin head may pass through the keyhole clearance and be retained by the keyhole slot and the keyhole terminus.

12. The system of claim 1 wherein the first display plate keyholes and the second display plate keyholes are positioned in the respective first display plate body and second display plate body such that each keyhole terminus is substantially equidistant from the respective first side edges and second side edges and aligned with the respective first display plate pins and second display plate pins, whereby upon removably installing the second display plate on the first display plate as by engaging the second display plate pins with the first display plate keyholes the respective first side edges and second side edges are aligned.

13. The system of claim 12 wherein the first display plate keyholes and the second display plate keyholes are positioned in the respective first display plate body and second display plate body such that the keyhole terminuses are near to and substantially equidistant from the respective first bottom edge and second bottom edge, whereby upon removably installing the second display plate on the first display plate the first indicia formed on the first display plate body is not obscured by the second display plate body.

14. The system of claim 1 wherein the mounting plate, the first display plate, and the second display plate are each made of a material selected from the group consisting of aluminum, steel, titanium, brass, alloy, polypropylene, polystyrene, polyvinyl chloride ("PVC"), acrylonitrile butadiene styrene ("ABS"), high density polyethylene ("HDPE"), low density polyethylene ("LDPE"), polycarbonate, polyurethane, thermoplastic, thermosetting polymer, wood, resin, and glass.

15. A kit comprising the display system of claim 1, the kit further comprising at least one adhesive strip.

16. The kit of claim 15 further comprising a level.

17. A method of employing the display system of claim 1, the method comprising the steps of:
- securing the mounting plate on a wall; and
- installing the first display plate on the mounting plate as by engaging the first display plate pins with the mounting plate keyholes to display the first indicia.

18. The method of claim 17 wherein the step of securing the mounting plate on a wall comprises the further steps of:
- installing an adhesive strip on the mounting plate body rear surface;
- activating the adhesive strip; and
- pushing the mounting plate body and adhesive strip against the wall.

19. The method of claim 17 wherein the step of installing the first display plate on the mounting plate comprises the further steps of:
- positioning the first display plate pins near the mounting plate keyholes;
- moving the first display plate toward the mounting plate so as to pass the first display plate pins into the keyhole clearances of the mounting plate keyholes; and
- shifting the first display plate laterally relative to the mounting plate so as to shift the first display plate pins into the keyhole terminuses of the mounting plate keyholes.

20. The method of claim 17, prior to the step of installing the first display plate on the mounting plate, further comprising the step of forming the first indicia on the first front surface of the first display plate body.

\* \* \* \* \*